United States Patent
Kuroda et al.

(10) Patent No.: US 6,421,779 B1
(45) Date of Patent: Jul. 16, 2002

(54) ELECTRONIC DATA STORAGE APPARATUS, SYSTEM AND METHOD

(75) Inventors: Yasutsugu Kuroda; Jun Kamada; Etsuo Ono, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/123,559

(22) Filed: Jul. 29, 1998

(30) Foreign Application Priority Data

Nov. 14, 1997 (JP) .............................................. 9-313878

(51) Int. Cl.[7] .................................................. H04L 9/00
(52) U.S. Cl. ........................ 713/169; 713/170; 713/176; 713/180
(58) Field of Search ........................... 705/57; 713/180, 713/181, 182, 165, 193, 194

(56) References Cited

U.S. PATENT DOCUMENTS

| | | | | |
|---|---|---|---|---|
| 4,458,109 A | * | 7/1984 | Mueller-Schloer | 380/30 |
| 5,606,610 A | * | 2/1997 | Johansson | 713/193 |
| 5,629,982 A | * | 5/1997 | Micali | 380/30 |
| 5,765,152 A | * | 6/1998 | Erickson | 707/9 |
| 5,958,051 A | | 9/1999 | Renaud et al. | |
| 5,983,295 A | * | 11/1999 | Cotugno | 710/74 |
| 6,021,491 A | | 2/2000 | Renaud | |

FOREIGN PATENT DOCUMENTS

| | | |
|---|---|---|
| EP | 0 157 258 | 10/1985 |
| EP | 0 354 774 | 2/1990 |
| EP | 0 670 543 A1 | 9/1995 |
| EP | 0 718999 A2 | 6/1996 |
| GB | 2 205 667 A | 12/1988 |
| GB | 2 234 143 A | 1/1991 |
| GB | 2 242 104 A | 9/1991 |
| GB | 2 267 631 A | 12/1993 |
| JP | 10-326078 | 12/1998 |

* cited by examiner

*Primary Examiner*—Thomas R. Peeso
(74) *Attorney, Agent, or Firm*—Staas & Halsey LLP

(57) ABSTRACT

An electronic data storage apparatus includes a data storage unit for storing electronic data; an authentication information generation unit for generating authentication information used in detecting an amendment made to the stored electronic data; and an authentication information data output unit for outputting the electronic data after adding to the electronic data the authentication information generated for the electronic data. When an authorization unit authorizes the electronic data storage apparatus after it is determined that the specification of the electronic data satisfies a predetermined condition, or when mutual authentication is performed between electronic data storage apparatuses, the electronic data storage apparatus stores the data. Thus, the electronic data can be protected from being illegally amended or deleted, and can be safely stored in a format in which sufficient legal evidence can be maintained on the electronic data.

54 Claims, 41 Drawing Sheets

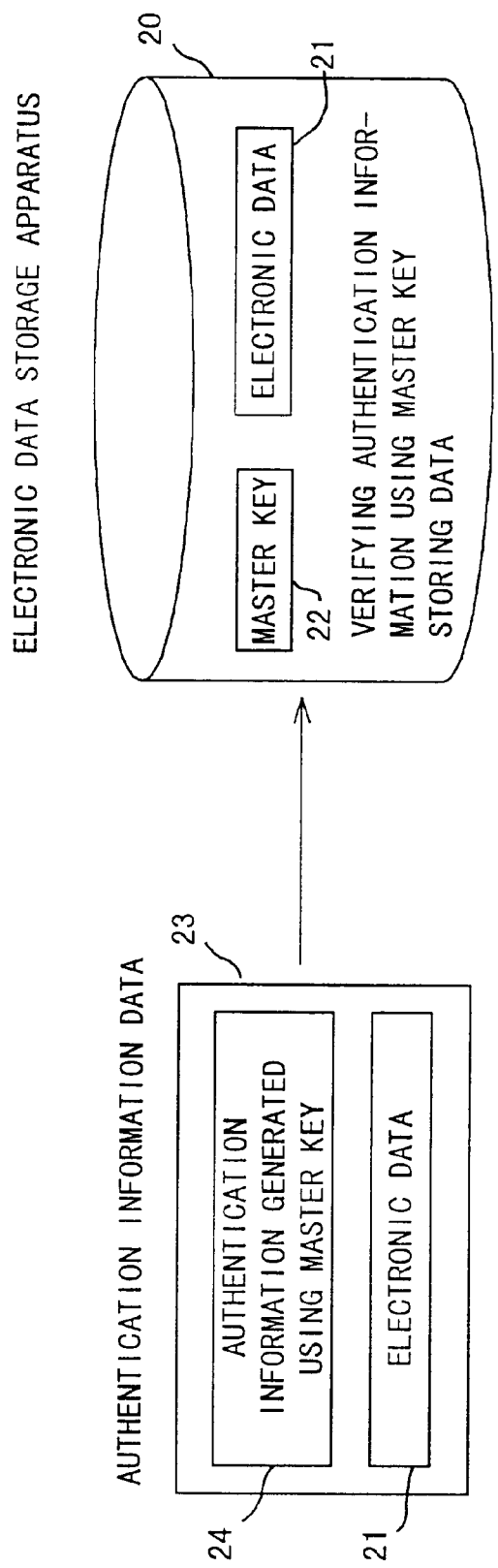
F I G. 10

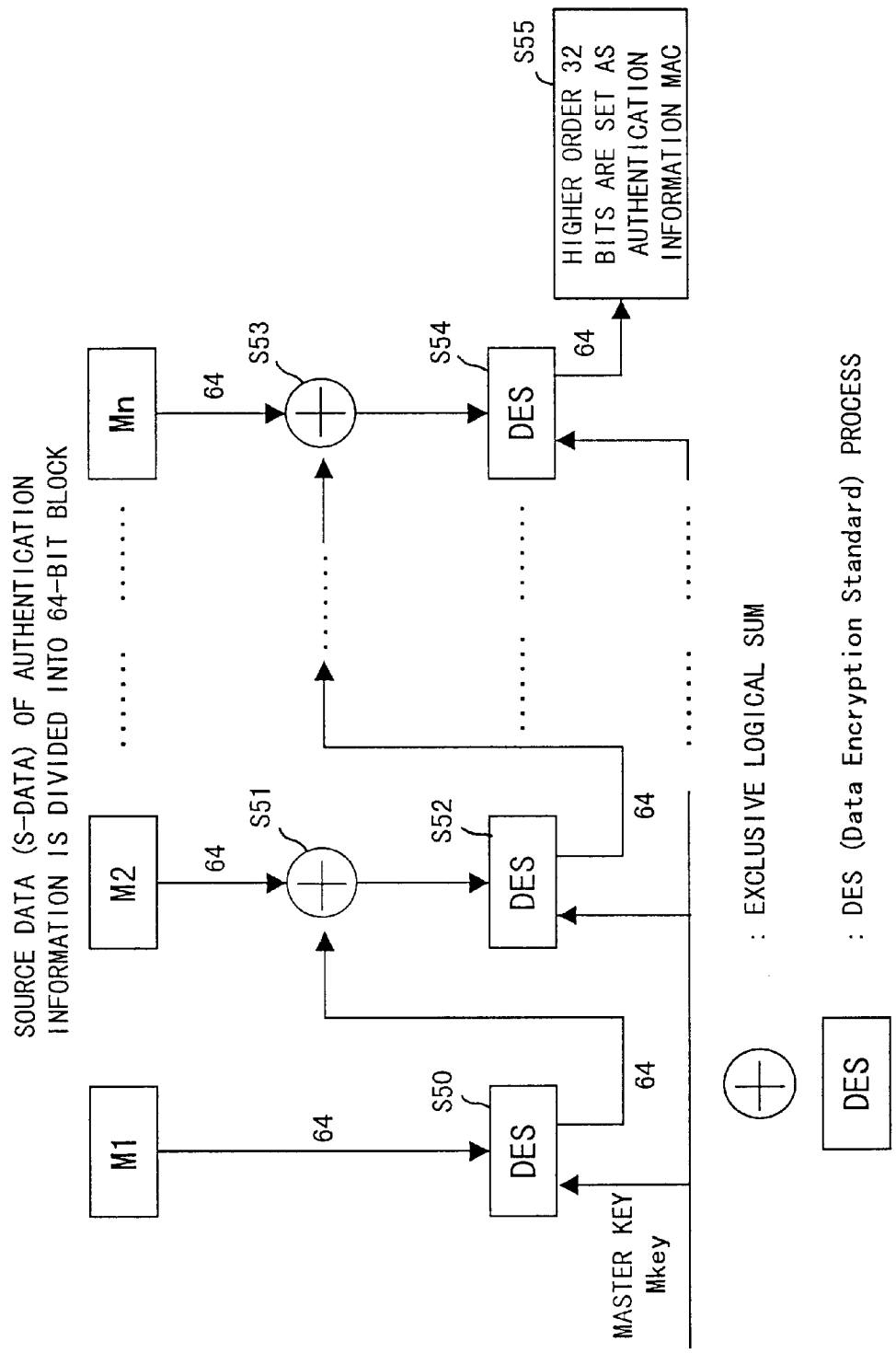
F I G. 17

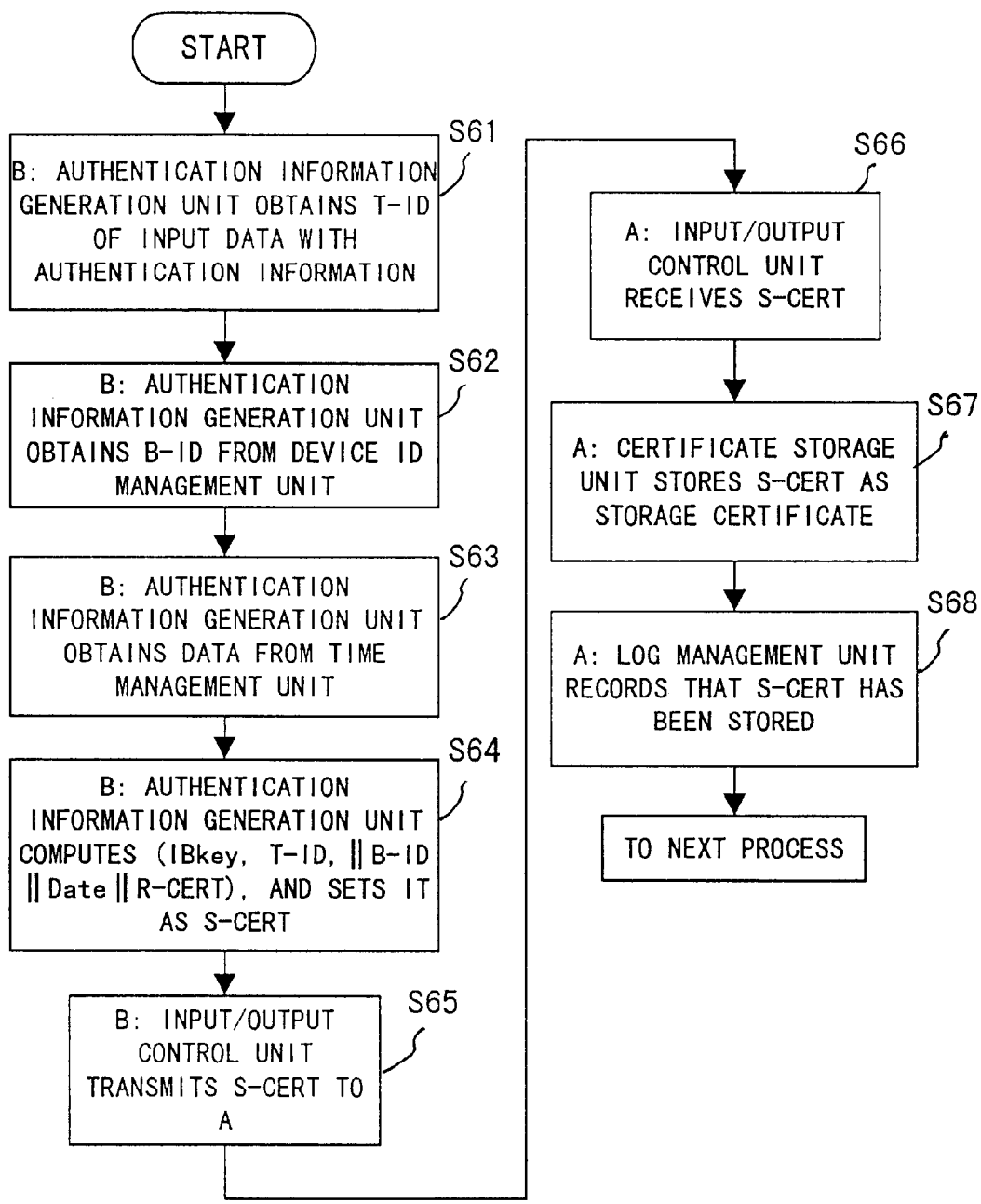
F I G. 1 8

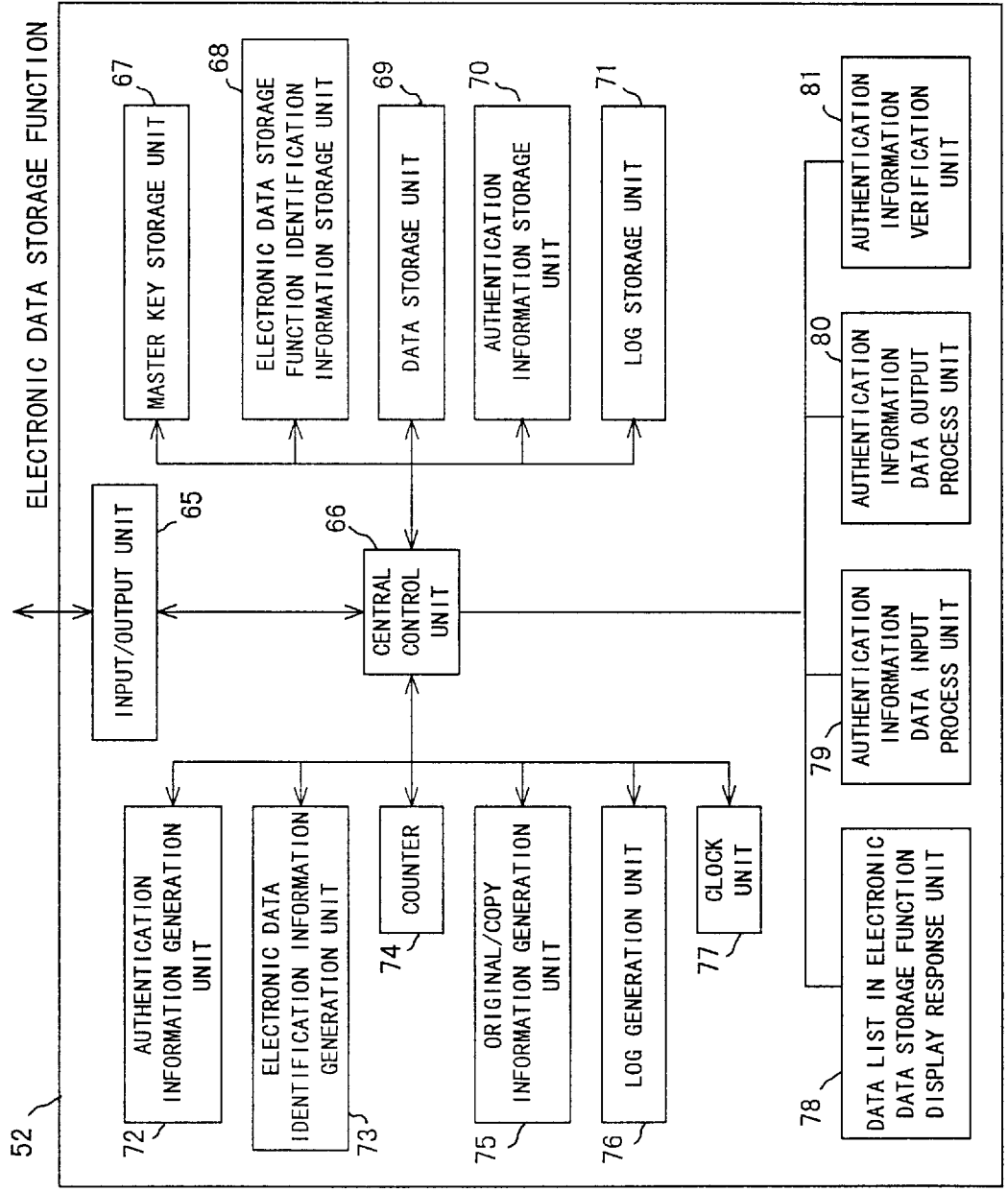
F I G. 23

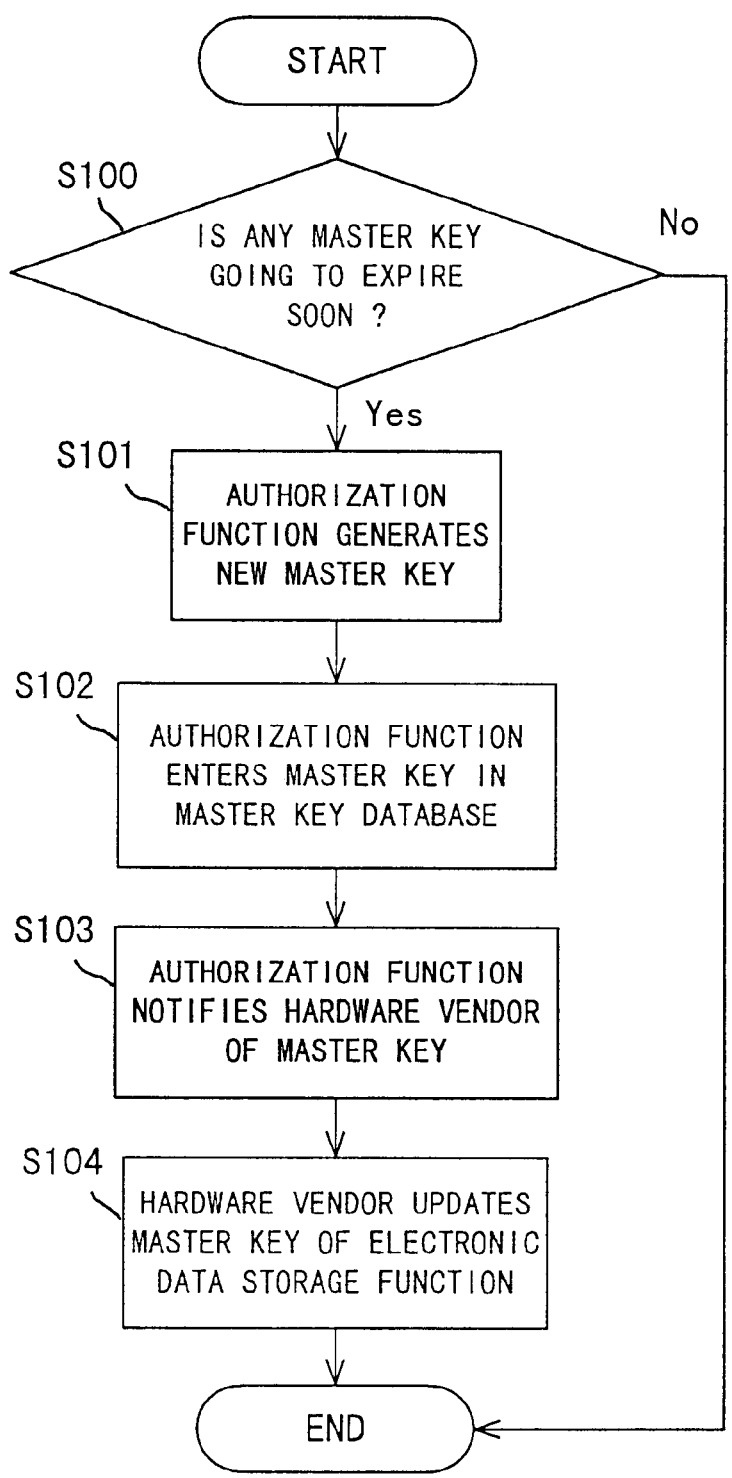
F I G. 27

| KEY | EFFECTIVE PERIOD | DISTRIBUTED TO: |
|---|---|---|
| MASTER KEY A | 19950101~19961231 | HARDWARE VENDOR 1<br>HARDWARE VENDOR 2<br>HARDWARE VENDOR 3 |
| MASTER KEY B | 19960101~19971231 | HARDWARE VENDOR 1<br>HARDWARE VENDOR 2<br>HARDWARE VENDOR 3<br>HARDWARE VENDOR 4 |
| MASTER KEY C | 19970601~19971231 | HARDWARE VENDOR 5<br>HARDWARE VENDOR 6 |

FIG. 28

| VENDOR IDENTIFICATION INFORMATION | NUMBER ASSIGNED TO VENDOR | VENDOR NAME |
|---|---|---|
| 0x00000001 | 0x0000~0xFFFF | HARDWARE VENDOR 1 |
| 0x00000002 | 0x0000~0xFFFF | HARDWARE VENDOR 2 |
| 0x00000003 | 0x0000~0xFFFF | HARDWARE VENDOR 3 |
| 0x00000004 | 0x0000~0xFFFF | HARDWARE VENDER 4 |
| 0x00000005 | 0x0000~0xFFFF | HARDWARE VENDOR 5 |
| 0x00000006 | 0x0000~0xFFFF | HARDWARE VENDOR 6 |
| 0x00000007 | 0x0000~0xFFFF | HARDWARE VENDOR 7 |
| 0x00000008 | 0x0000~0xFFFF | HARDWARE VENDOR 8 |
| 0x00000009 | 0x0000~0xFFFF | HARDWARE VENDOR 9 |

FIG. 29

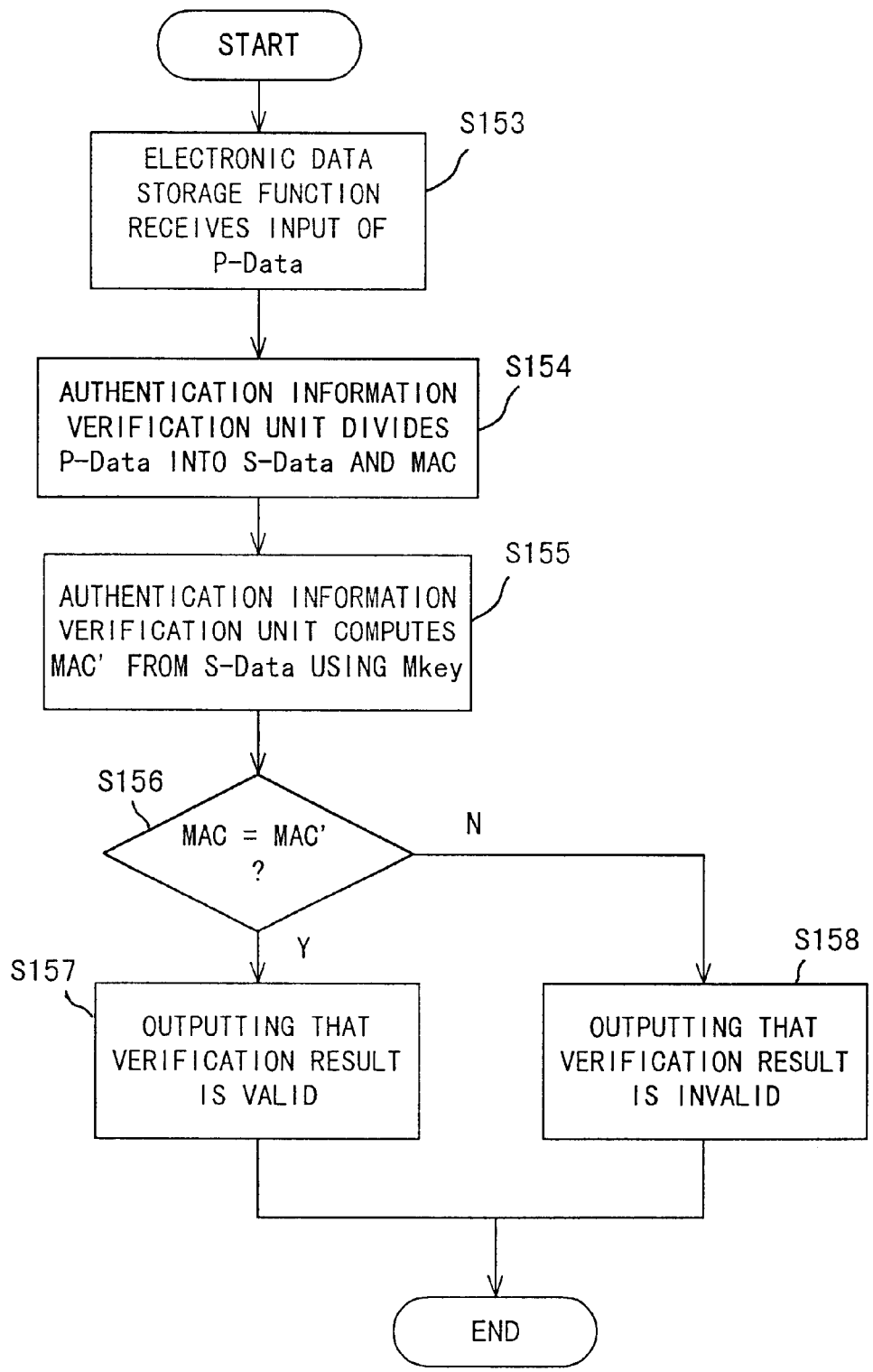
F I G. 33

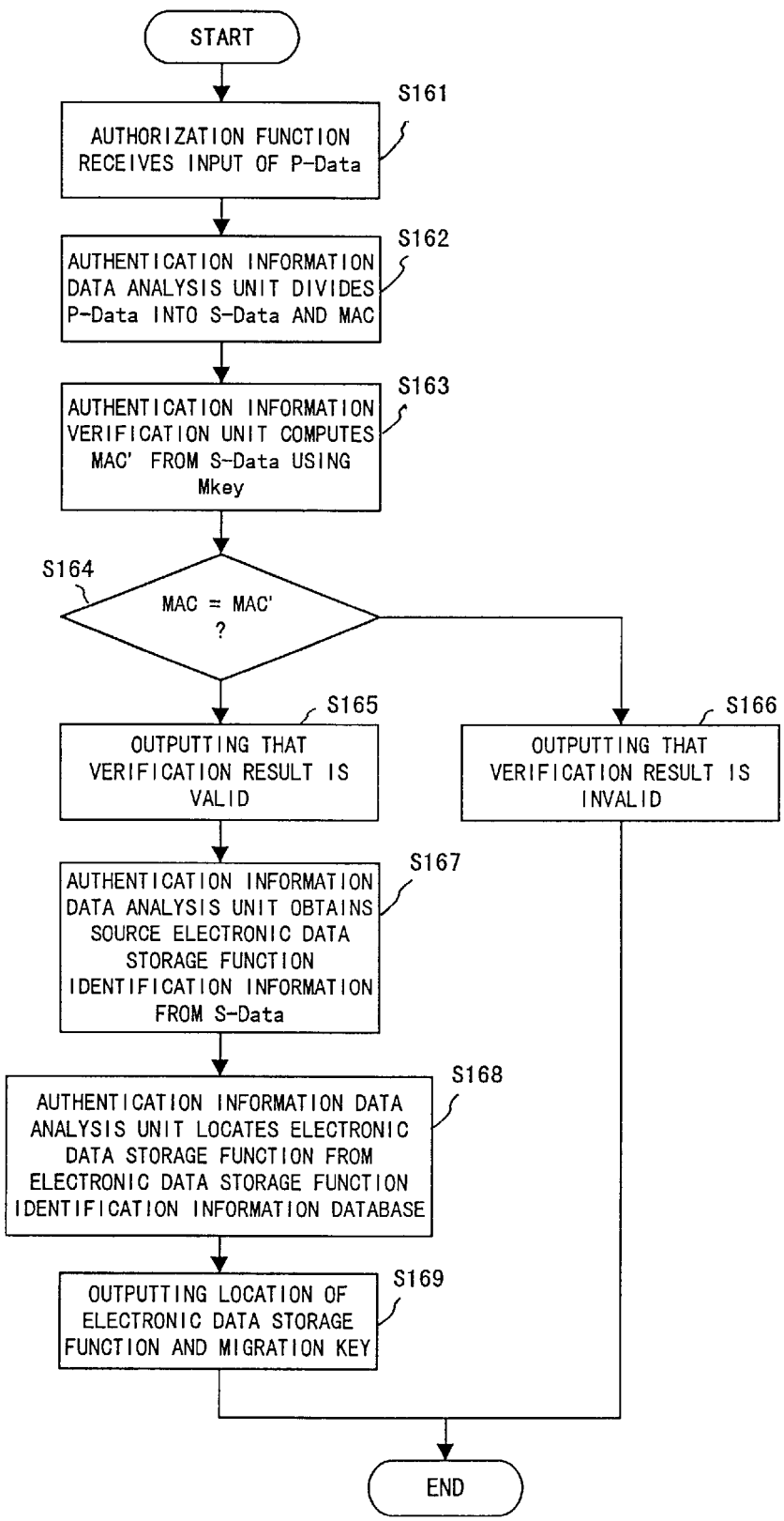
F I G.  3 5

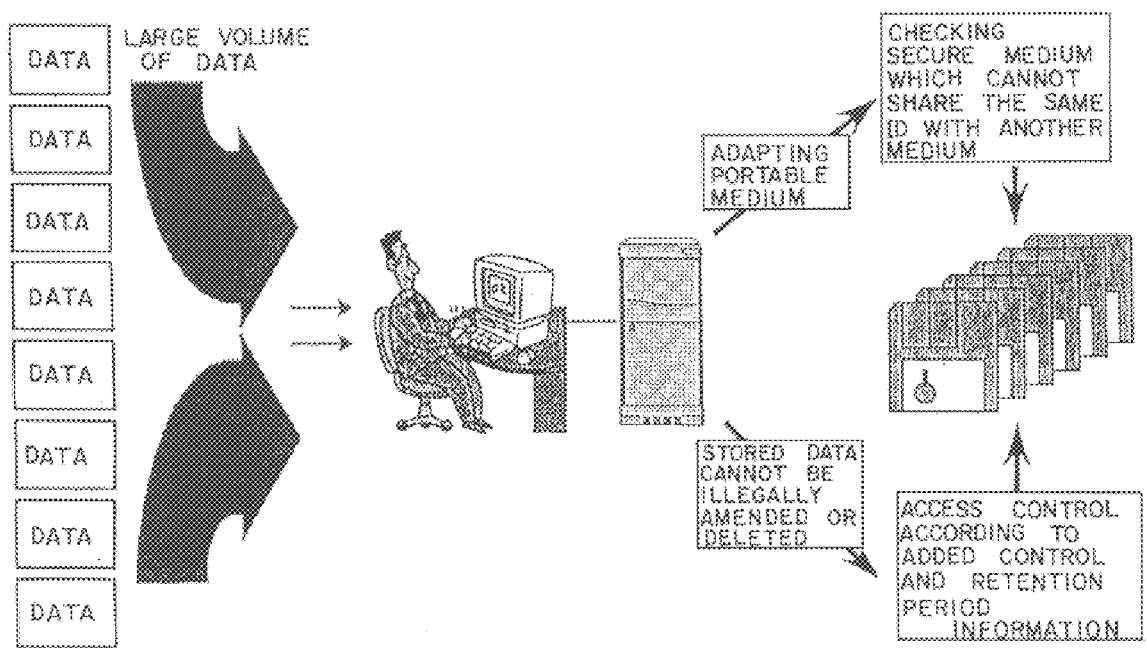
F I G. 37

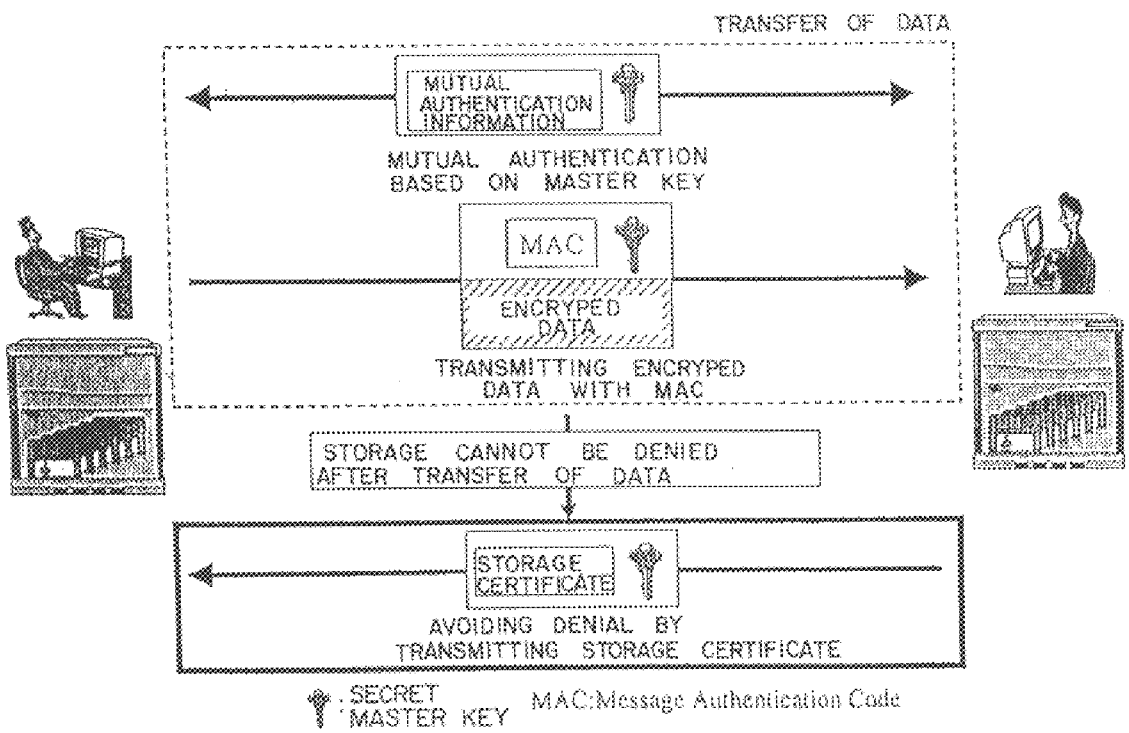
F I G. 40

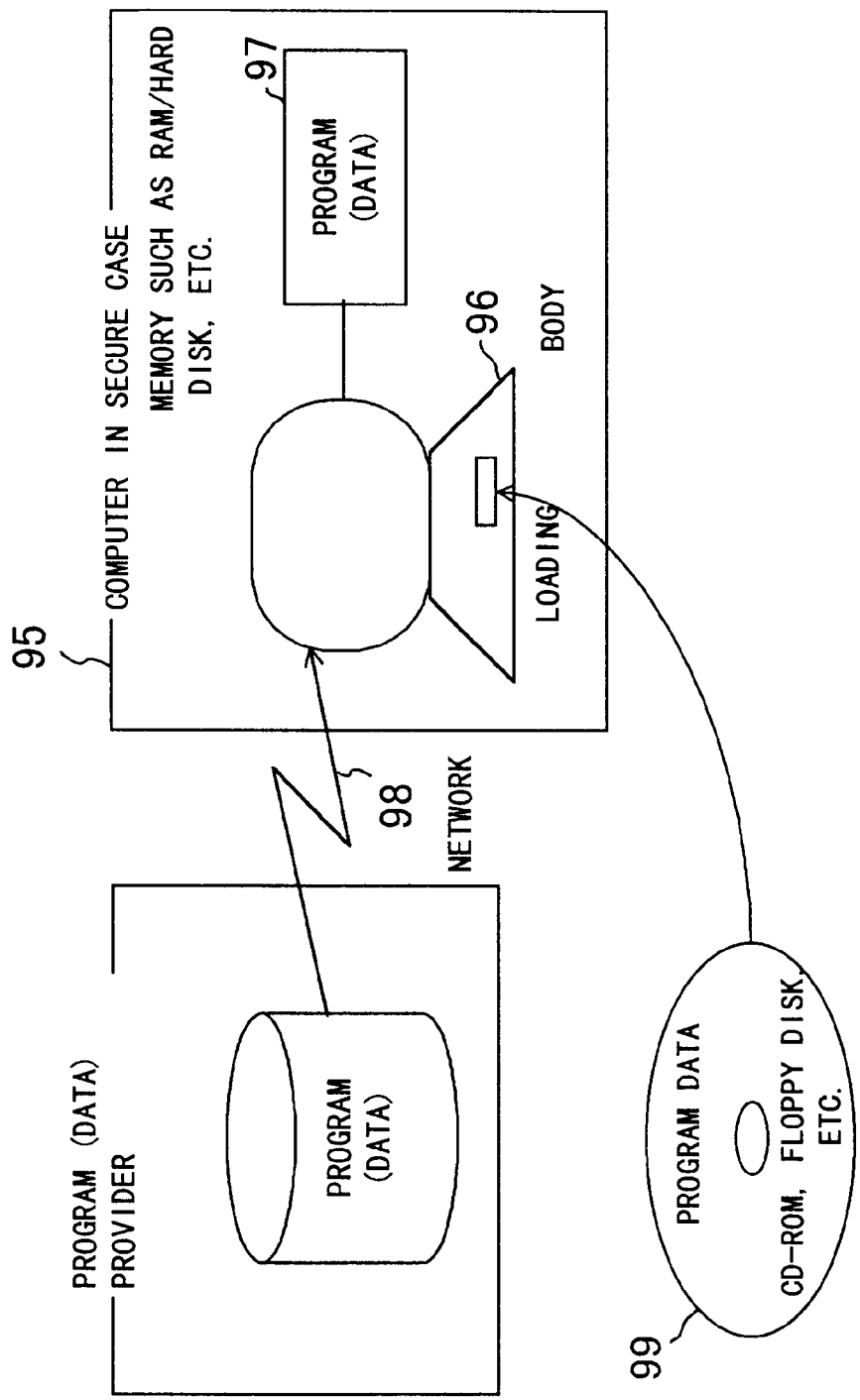
F I G. 41

ELECTRONIC DATA STORAGE APPARATUS, SYSTEM AND METHOD

BACKGROUND OF THE INVENTION

FIELD OF THE INVENTION

The present invention relates to an electronic data storage system, and more specifically to an electronic data storage apparatus, system, and method for safely protecting electronic data against illegal amendments and deletion, and maintaining the sufficient legal evidence of the electronic data.

Conventionally, the first method of storing electronic data with reliability is to have a reliable third party TTP (Trusted Third Party) and trust the TTP with the electronic data. FIG. 1 shows the data reliability guarantee system through the TTP.

In FIG. 1, the TTP stores data with the electronic signatures of, for example, A and B to process the data as a reliable agreement between A and B. The electronic signatures indicating the agreement of A and B can be represented as an RSA which is a public key encryption based on the factorization in prime numbers, the oval curve, or an individual key shared by the TTP, A, and B. There has been the problem that, when the electronic data is stored by the TTP, A cannot deny to B that A has agreed with the electronic data because the data with the electronic signature of A is stored by the TTP even though A insists later that A has not agreed with the electronic data.

FIG. 2 shows that a large volume of electronic data is stored by the TTP. In the system using the TTP, each time a transaction such as a contract made between A and B, etc. occurs, it is necessary to store data of the contract, etc. With the increasing number of transactions, the volume of the electronic data to be stored greatly increases. Apart from the problem of the maintenance of the reliability of a document, the electronic data is stored for each transaction so that B cannot deny the fact that A and B agreed with the electronic data, that is, so that the agreement cannot be denied later. This produces the problem that data is concentrated. As a result, it is recommended that the reliability of data is guaranteed while the data is distributed for storage to avoid the concentration of data for all transactions.

FIG. 3 shows the necessity of the network security and the data security to, for example, store and transmit electronic data with sufficient legal evidence maintained. In FIG. 3, the network security can be realized by encrypting data, submitting identification papers, and transmitting the electronic data with electronic signatures to avoid illegal amendments through a network. However, even if the transferred data is stored as a certificate and accompanying electronic signatures on, for example, floppy disks, the security of the data cannot be guaranteed if the data is illegally amended or deleted. Therefore, the security of the stored electronic data should be guaranteed.

FIG. 4 shows the second method of storing electronic data on paper with the sufficient legal evidence of the electronic data maintained. As shown in FIG. 4, the data such as a contract of a corporation, a final return of a government office, a patient's card in hospital, etc. should be legally stored for a predetermined period. When such legally stored data are managed on a medium such as a hard disk, a floppy disk, etc., they can possibly be illegally amended or deleted. Therefore, according to the conventional technology, the data should have been printed on paper for storage. Under such circumstances, the security of electronic data should be guaranteed as well as the data printed on paper.

FIG. 5 shows the four conditions required for the electronic data storage system to realize the security of, as well as retrieve, the data printed on paper for storage. The first condition relates to retention of data. In the retention period, data should be stored in a restorable state. The second condition relates to the correctness of data. The data should be retrieved as correct data. The third condition relates to readability. The contents of data should be read as necessity. The fourth condition relates to legal evidence. The data should be maintained with legal evidence for use in a trial.

The above listed four conditions have been required in the electronic data storage system to realize the security obtained by the data written on paper.

As described above, in the first conventional method of storing electronic data, that is, in the method to be followed by a TTP, there is the problem that the storage capacity and the performance of the TTP is limited because the electronic data is concentrated on the TTP, and the problem that, the reliability of data is not guaranteed when, for example, an electronic signature is realized by a shared individual key and the key is accidentally lost.

In the second method, that is, when electronic data is printed and stored on paper, there is the problem about the place for storage of the paper, and about the labor required to search for necessary data and reenter data when the data is reused. These operations are labor-intensive, costly, and inefficient.

SUMMARY OF THE INVENTION

The present invention aims at realizing an electronic data storage apparatus capable of distributing and managing electronic data while maintaining the security and legal evidence of the electronic data; realizing an electronic data storage system capable of distributing the electronic data and storing them in a plurality of electronic data storage apparatus by an authorization organization guaranteeing the reliability of the electronic data storage apparatus; and providing a method of storing electronic data whose security can be guaranteed by the electronic data storage apparatus.

According to the first embodiment of the present invention, the electronic data storage apparatus 1 includes a data storage device; an authentication information generation device; and an authentication information data output device.

The data storage device stores electronic data. The data authentication information generation device generates the data authentication information for use in verifying the correctness of the electronic data stored in the data storage device. When the authentication information data output device externally outputs the electronic data stored in the data storage device, it adds to the electronic data the authentication information generated for the electronic data, and then outputs the resultant data.

The electronic data storage apparatuses independently function, and authenticate each other. To establish the reliability of the electronic data, authentication information is generated to check the existence of illegal amendment to the electronic data. The electronic data provided with the authentication information is transferred between electronic data storage apparatuses.

Thus, an electronic data storage apparatus can be realized with the electronic data secured and managed in a distributed manner.

The electronic data storage apparatus according to the first embodiment of the present invention can perform various basic processes using a master key by providing a master key storage device for storing a common master key in a plurality of electronic data storage apparatuses.

The first process performed using a master key is mutual authentication through which electronic data storage apparatuses mutually authenticate one another. That is, the mutual authentication is performed between electronic data storage apparatuses which store distributed electronic data. After the mutual authentication, the stored electronic data can be transferred.

The second process performed using a master key is to generate authentication information for use in verifying the correctness of the amendments to data, and to output as authentication information data the electronic data provided with the authentication information to a unit external to the electronic data storage apparatuses.

The third process performed using a master key is to verify authentication information using a master key when electronic data provided with the authentication information is externally input, and to store the data in the data storage device only when it is proved that no illegal processes have been performed on the data.

The fourth process performed using a master key is to generate using a master key a storage certificate to certify the storage of electronic data when the electronic data is stored after the correctness of authentication information data is verified.

Each of the electronic data storage apparatus can be provided with a unique individual key. Using the individual key, a data transfer request certificate, a storage certificate, and a storage certificate receipt certificate for use in, for example, avoiding the denial of data storage.

That is, when data is transferred, for example, from an electronic data storage apparatus A to an electronic data storage apparatus B, a data transfer request certificate certifying that a transfer request has been issued is transmitted from the electronic data storage apparatus A to the electronic data storage apparatus B, a storage certificate certifying that the data has been stored is transmitted from the electronic data storage apparatus B to the electronic data storage apparatus A, and a storage certificate receipt certificate certifying that the storage certificate has been received is transmitted from the electronic data storage apparatus A to the electronic data storage apparatus B. Thus, since it can be proved afterwards using these certificates that the electronic data has been transferred and stored, the problem of the denial which cannot be solved between the electronic data storage apparatuses A and B through the conventional TTP can be successfully solved.

Furthermore, according to the first embodiment of the present invention, an electronic data storage apparatus identification information for uniquely identifying an electronic storage apparatus can be assigned to each electronic data storage apparatus, or electronic data identification information related to the electronic data storage apparatus identification information about the electronic data storage apparatus which stores the electronic data can be assigned to each piece of the electronic data. Therefore, an electronic data storage apparatus which stores certain electronic data in a plurality of electronic data storage apparatuses having a common master key can be located.

In the electronic data storage system according to the second embodiment, an authorization device for authorizing a plurality of electronic data storage apparatuses is provided in addition to the plurality of electronic data storage apparatuses. The authorization device includes a specification check device for checking the specification of the electronic data storage apparatus and authorizing the electronic data storage apparatus when the specification meets predetermined conditions. Thus, the reliability of the electronic data storage apparatus can be guaranteed by the authorization device, and the electronic data is distributed for storage in a plurality of electronic data storage apparatuses.

According to the second embodiment of the present invention, a master key commonly used among the plurality of electronic data storage apparatus, and electronic data storage apparatus identification information for uniquely identifying each of the electronic data storage apparatuses can be assigned to each of the electronic data storage apparatuses. Furthermore, the electronic data stored in an electronic data storage apparatus can be assigned the electronic data identification information associated with the electronic data storage apparatus identification information assigned to the electronic data storage apparatus so that the electronic data can be associated with the authentication information for the electronic data to uniquely identify the electronic data.

When electronic data is transferred from one electronic data storage apparatus to another electronic data storage apparatus, the electronic data can be transferred together with authentication information which is generated using a master key and associated with the information indicating that the electronic data is original data or a copy of the original data, and with the source and destination electronic data storage apparatus identification information, history and so on. Therefore, the original electronic data can be located and managed.

Thus, according to the second embodiment of the present invention, authentication information can be generated by an electronic data storage apparatus storing electronic data using a master key assigned by an authorization function. Therefore, by verifying authentication information using a master key, it can be confirmed that the data is stored in the electronic data storage apparatus authorized by the authorization function, thereby guaranteeing the reliability of the data.

In the method of storing electronic data according to the present invention, for example, authentication information for use in detecting the correctness of electronic data is generated for the electronic data stored in the electronic data storage apparatus. When the stored electronic data is output, the authentication information generated for the electronic data is added to the electronic data and output together.

Furthermore, in the method of storing electronic data according to the present invention, when electronic data with authentication information for use in detecting the correctness of the electronic data is input, the contents of the authentication information is verified, and the electronic data is stored only when the incorrectness of the electronic data is not detected.

Additionally, in the method of storing electronic data according to the present invention, the electronic data storage apparatus stores electronic data after the authorization device for authorizing an electronic data storage apparatus determines that the specification of the electronic data storage apparatus which stores the electronic data meets the predetermined conditions. Thus, the method of storing electronic data according to the present invention guarantees the user the security and the correctness of the electronic data.

The electronic data storage apparatus can also be realized using a program storage medium. That is, the electronic data storage apparatus according to the present invention can be realized by installing to, for example, a personal computer a storage medium which stores a program having the function of generating authentication information for use in searching the stored electronic data for the existence of an illegal amendment to the electronic data, and the function of outputting the authentication information generated for the electronic data and added to the electronic data when the stored electronic data is output.

The electronic data storage apparatus according to the present invention can also be realized by installing to a personal computer, etc. a storage medium which stores a program having the function of verifying the contents of authentication information when electronic data provided with authentication information for use in checking the existence of an illegal amendment to the electronic data, and the function of storing the electronic data only when the incorrectness of the electronic data is not detected.

BRIEF DESCRIPTION OF THE DRAWINGS

The present invention will be more apparent from the following detailed description, when taken in conjunction with the accompanying drawings in which:

FIG. 10 shows the input of authentication information data;

FIG. 17 shows the method of computing the MAC (Message Authentication Code) as the authentication information about electronic data;

FIG. 18 is a flowchart showing the process in the storage certificate phase;

FIG. 23 is a block diagram showing the configuration of the electronic data storage function;

FIG. 27 is a flowchart showing the processes performed when a master key is updated through an authorization function;

FIG. 28 shows an example of the contents stored in the master key database;

FIG. 29 shows an example of the contents stored in the electronic data storage function identification information database;

FIG. 33 is a flowchart showing the authentication information verification process by the electronic data storage function;

FIG. 35 is a flowchart showing the location output process of authentication information electronic data by the authorization function;

FIG. 37 shows obtaining the maintainability of the electronic data according to the present invention;

FIG. 40 shows guaranteeing the reliability of data through a storage certificate to give electronic data a legal ground; and FIG. 41 shows loading to a computer a program for realizing the electronic data storage apparatus according to the present invention.

DESCRIPTION OF THE PREFERRED EMBODIMENTS

Figure 6:
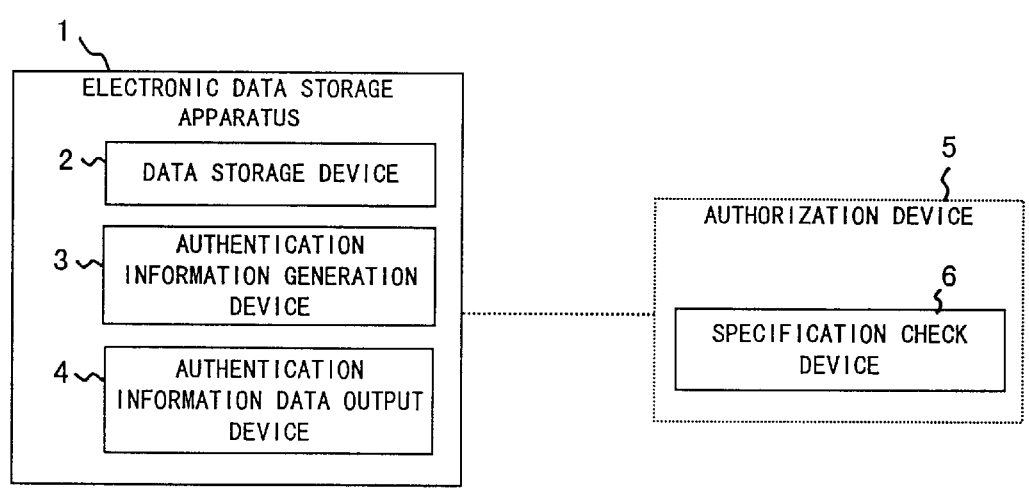
FIG. 6 is a block diagram showing the principle of the present invention.

FIG. 6 is a block diagram showing the configuration according to the present invention including an electronic data storage apparatus as the first embodiment of the present invention, and an electronic data storage system as the second embodiment of the present invention.

According to the first embodiment of the present invention, an authorization device 5 indicated by the broken lines shown in FIG. 6 is not used, but normally a plurality of electronic data storage apparatuses 1 independently store electronic data by moving the electronic data to and from other electronic data storage apparatuses.

In FIG. 6, the electronic data storage apparatus 1 includes a data storage device 2; an authentication information generation device 3; and an authentication information data output device 4.

The data storage device 2 stores electronic data. The authentication information generation device 3 generates the authentication information for use in verifying the correctness of the electronic data stored in the data storage device 2. When the authentication information data output device 4 externally outputs the electronic data stored in the data storage device 2, it adds to the electronic data the authentication information generated for the electronic data, and then outputs the resultant data.

In the electronic data storage system according to the second embodiment, as shown in FIG. 6, an authorization device 5 for authorizing a plurality of electronic data storage apparatuses is provided in addition to the plurality of electronic data storage apparatuses. The authorization device 5 includes a specification check device 6 for checking the specification of the electronic data storage apparatus and authorizing the electronic data storage apparatus when the specification meets predetermined conditions.

Figure 7:
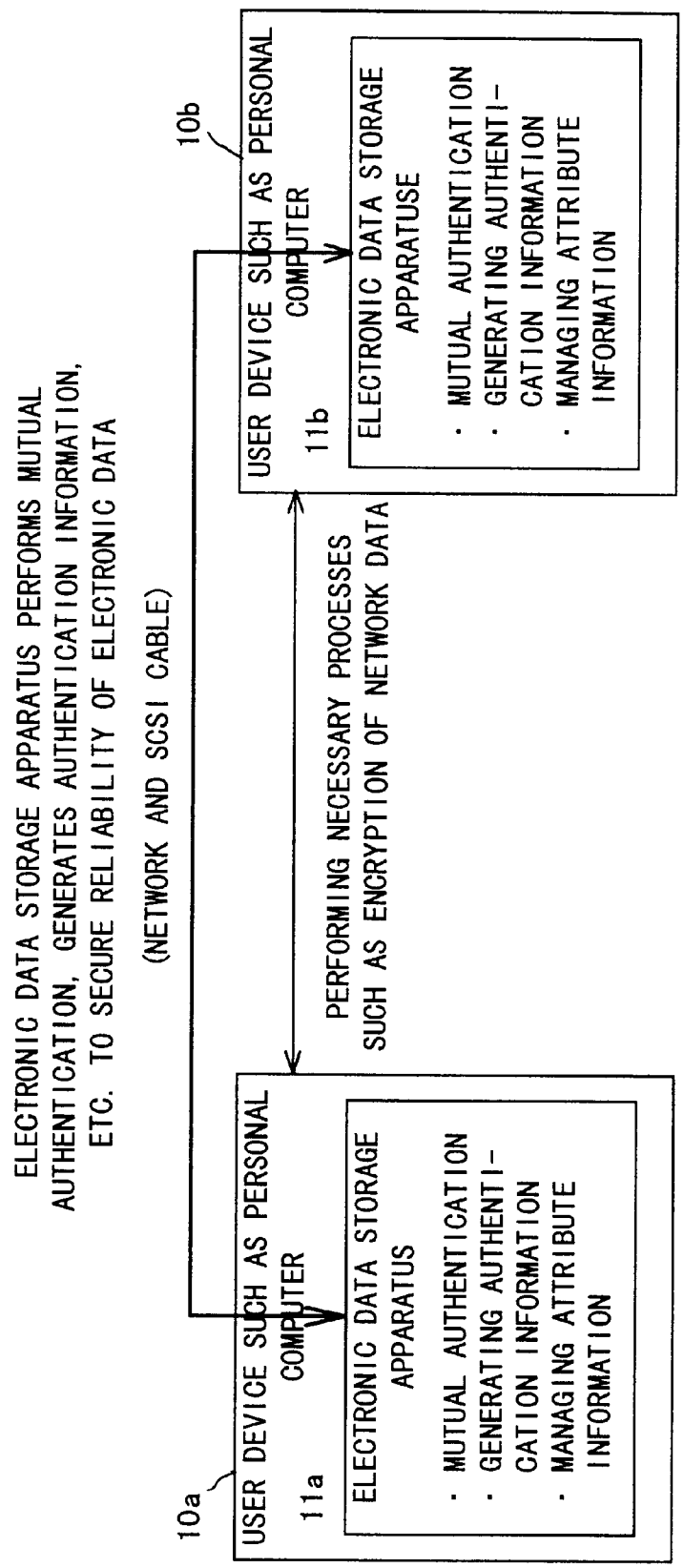
FIG. 7 shows the basic process such as mutual authentication between electronic data storage apparatuses according to the first embodiment of the present invention.

The embodiments of the present invention are described below in detail by referring to the attached drawings. FIG. 7 shows the basic operations of an electronic data storage apparatus according to the first embodiment of the present invention. In FIG. 7, for example, electronic data storage apparatuses 11a and 11b according to the first embodiment of the present invention are provided in user devices 10a and 10b such as a personal computer, etc.

According to the first embodiment of the present invention, the electronic data storage apparatuses independently function, and authenticate each other before the electronic data is transferred to and from another electronic data storage apparatus, that is, perform the mutual authentication. To establish the reliability of the electronic data, authentication information is generated to check the existence of illegal amendment to the electronic data. The electronic data provided with the authentication information is transferred between electronic data storage apparatuses. The mutual authentication and the transfer of the data provided with the authentication information are performed through a network and an SCSI (Small Computer System Interface) cable. When the data is transferred, necessary processes such as the encryption of data in the network, etc. are performed. That is, according to the first embodiment of the present invention, the electronic data storage apparatuses mutually authenticate each other, generate the authentication information for the electronic data, manages the attribute information about the data stored with the electronic data, etc.

Figure 8:
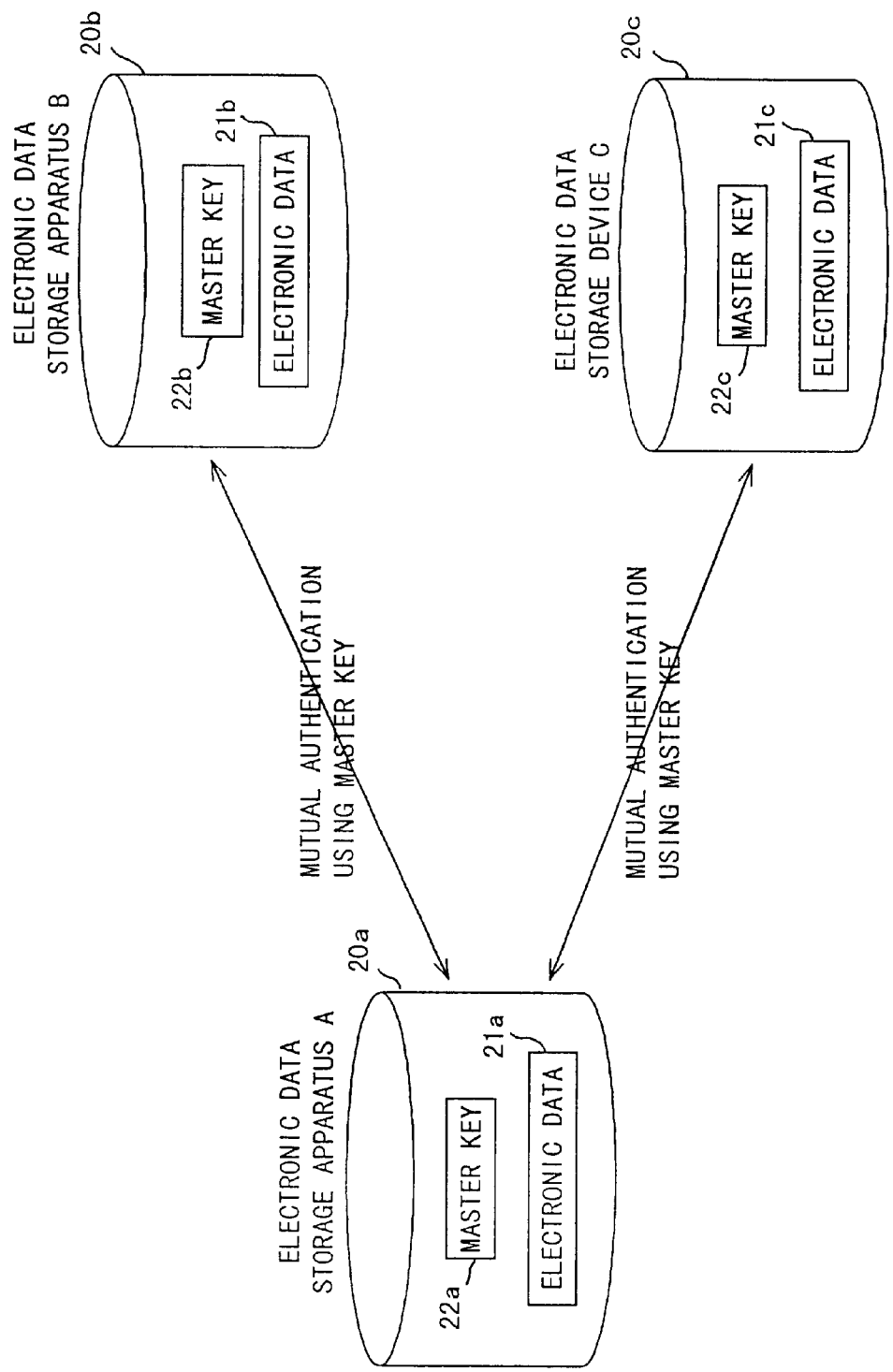
FIG. 8 shows the mutual authentication system using a master key according to the first embodiment of the present invention.

FIG. 8 shows the mutual authentication system operated using a master key among a plurality of electronic data storage apparatuses. In FIG. 8, a plurality of electronic data storage apparatuses A20a, B20b, and C20c respectively store electronic data 21a, 21b, and 21b, and also store master keys to use for mutual authentication, etc. 22a, 22b, and 22c. These master keys are identical. For example, before moving the electronic data 21a stored in the electronic data storage apparatus A20a to the electronic data storage apparatus B20b, the mutual authentication is performed using a master key between the electronic data storage apparatuses 20a and 20b.

Figure 9:
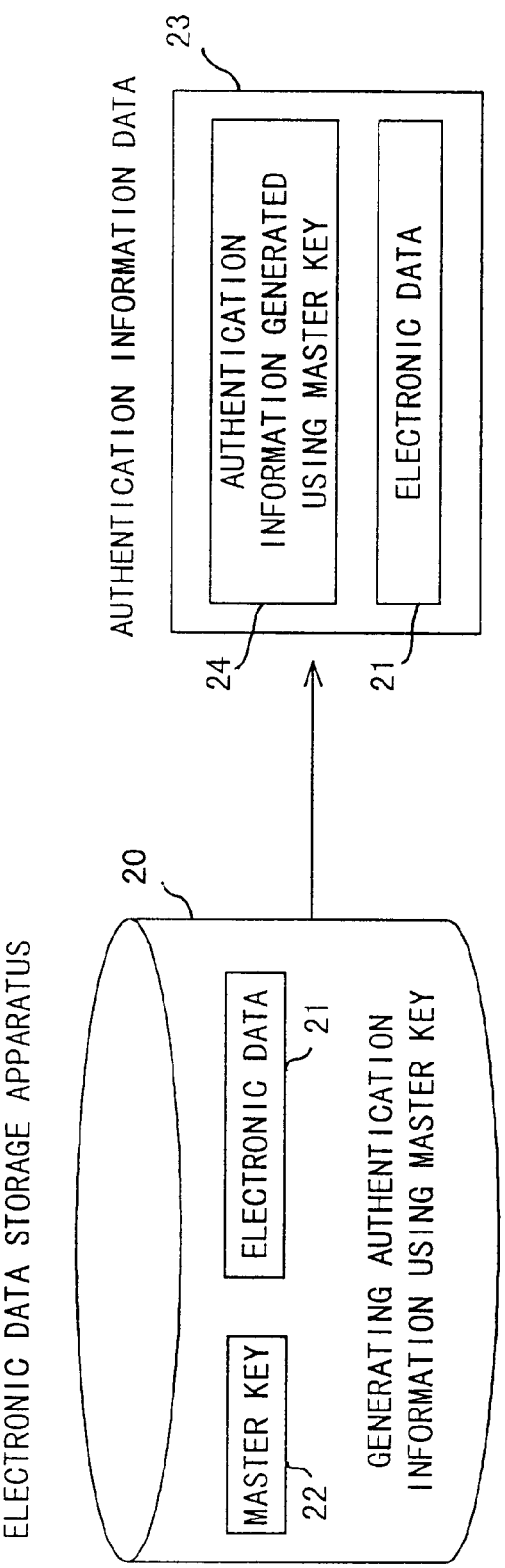
FIG. 9 shows the output of authentication information data generated using a master key.

FIG. 9 shows the system for outputting data provided with authentication information. In this system, authentication information indicating the correctness of the data is generated for the electronic data using a master key when the electronic data is transferred, that is, output, from the electronic data storage apparatus A20a to the electronic data storage apparatus B20b as shown in FIG. 8. The generated authentication information is output with the electronic data. In FIG. 8, when the electronic data 21 stored in the electronic data storage apparatus 20 is output, the authentication information is generated for the electronic data using the master key 22. The information, that is, authentication information 24 generated using a master key, is output to, for example, the electronic data storage apparatus B20b shown in FIG. 8 as authentication information data 23 together with the electronic data 21.

FIG. 10 shows the system for inputting, to the electronic data storage apparatus, the data provided with authentication information. For example, the authentication information data 23 output by another electronic data storage apparatus, that is, the authentication information data 23 provided with the authentication information 24 generated using a master key for the electronic data 21, is verified by the master key 22 for the contents of the authentication information 24 before being input to the electronic data storage apparatus 20. The input electronic data 21 is stored in the electronic data storage apparatus 20 when an illegal amendment to the data is not detected.

Figure 11:
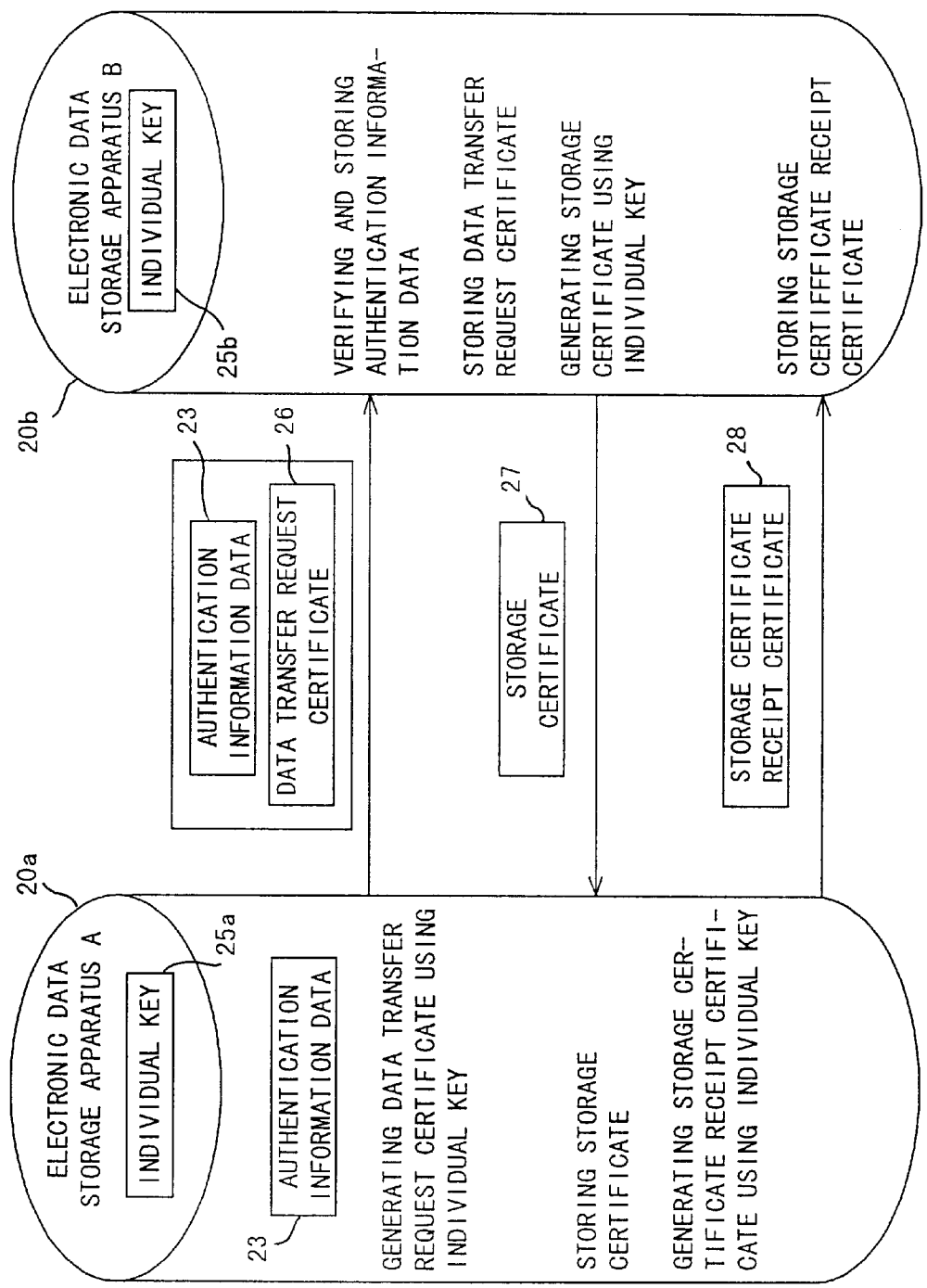
FIG. 11 shows the input/output of the data transfer request certificate, the storage certificate, and the storage certificate receipt certificate between electronic data storage apparatuses using an individual key.

FIG. 11 shows the system for processing data using a data transfer request certificate, a storage certificate, and a storage certificate receipt certificate when electronic data is transferred between electronic data storage apparatuses. In FIG. 11, the electronic data storage apparatuses A20a and B20b contain individual keys 25a and 25b for use in generating the above described certificates.

When electronic data is transferred from the electronic data storage apparatus A20a to the electronic data storage apparatus B20b, the electronic data storage apparatus A20a first generates a data transfer request certificate 26 using the individual key 25a, and a data transfer request certificate 26 is transmitted together with the authentication information data 23 to the electronic data storage apparatus B20b.

The electronic data storage apparatus B20b verifies the contents of the authentication information, stores the data together with a data transfer request certificate if the electronic data storage apparatus B20b determines that an illegal amendment has not been made to the data, and then generates a storage certificate 27 using the individual key 25b and transmits it to the electronic data storage apparatus A20a.

The electronic data storage apparatus A20a stores the storage certificate 27, generates a storage certificate receipt certificate 28 using the individual key 25a, and transmits it to the electronic data storage apparatus B20b. The electronic data storage apparatus B20b stores the storage certificate receipt certificate 28, and terminates the process of transferring the electronic data.

The data transfer request certificate 26 and storage certificate 27 include Data-ID consisting of a Device-ID, Medium-ID and File-ID.

Figure 12:
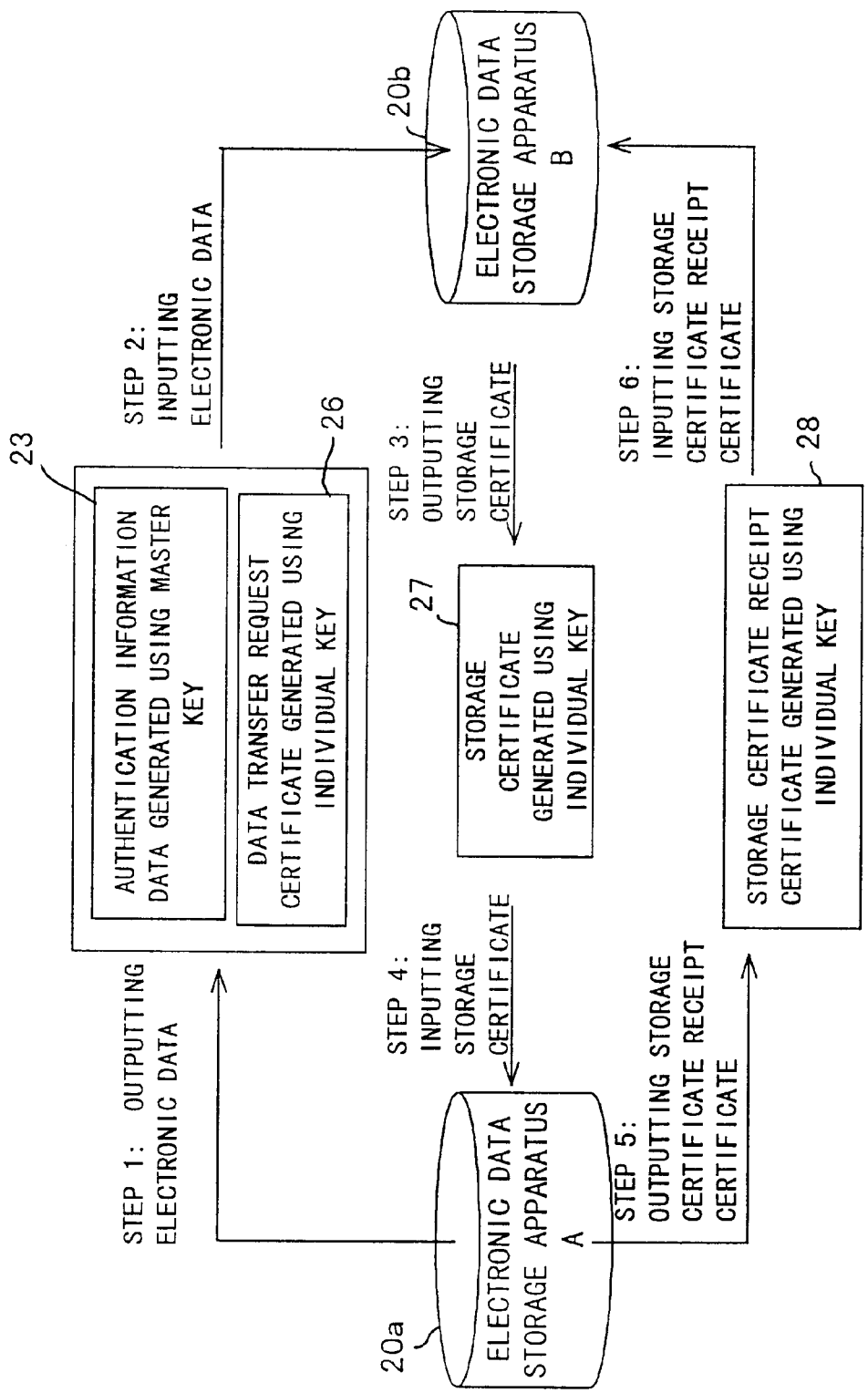
FIG. 12 shows the entire process of transferring electronic data between electronic data storage apparatuses.

FIG. 12 shows the procedure of the electronic data transfer system shown in FIG. 11. The steps 1 through 6 in FIG. 12 are similar to the descriptions shown in FIG. 11. First, when electronic data is output from the electronic data storage apparatus A20a in step 1, the data transfer request certificate 26 generated using an individual key is output with the authentication information data 23 generated using a master key. When the electronic data is input to the electronic data storage apparatus B20b in step 2, the contents of the authentication information is verified using a master key, and the data is stored with the data transfer request certificate 26 if it is determined that an illegal amendment has not been made to the data.

In step 3, the storage certificate 27 indicating that the authentication information data 23 and the data transfer request certificate 26 have been stored is generated using an individual key, and output from the electronic data storage apparatus B20b. In step 4, the storage certificate 27 is stored in the electronic data storage apparatus A20a. In step 5, the storage certificate receipt certificate 28 indicating that the electronic data storage apparatus A20a has stored a storage certificate 27 is generated using an individual key, and output from the electronic data storage apparatus A20a. The certificate is input to the electronic data storage apparatus B20b in step 6.

Figure 13:
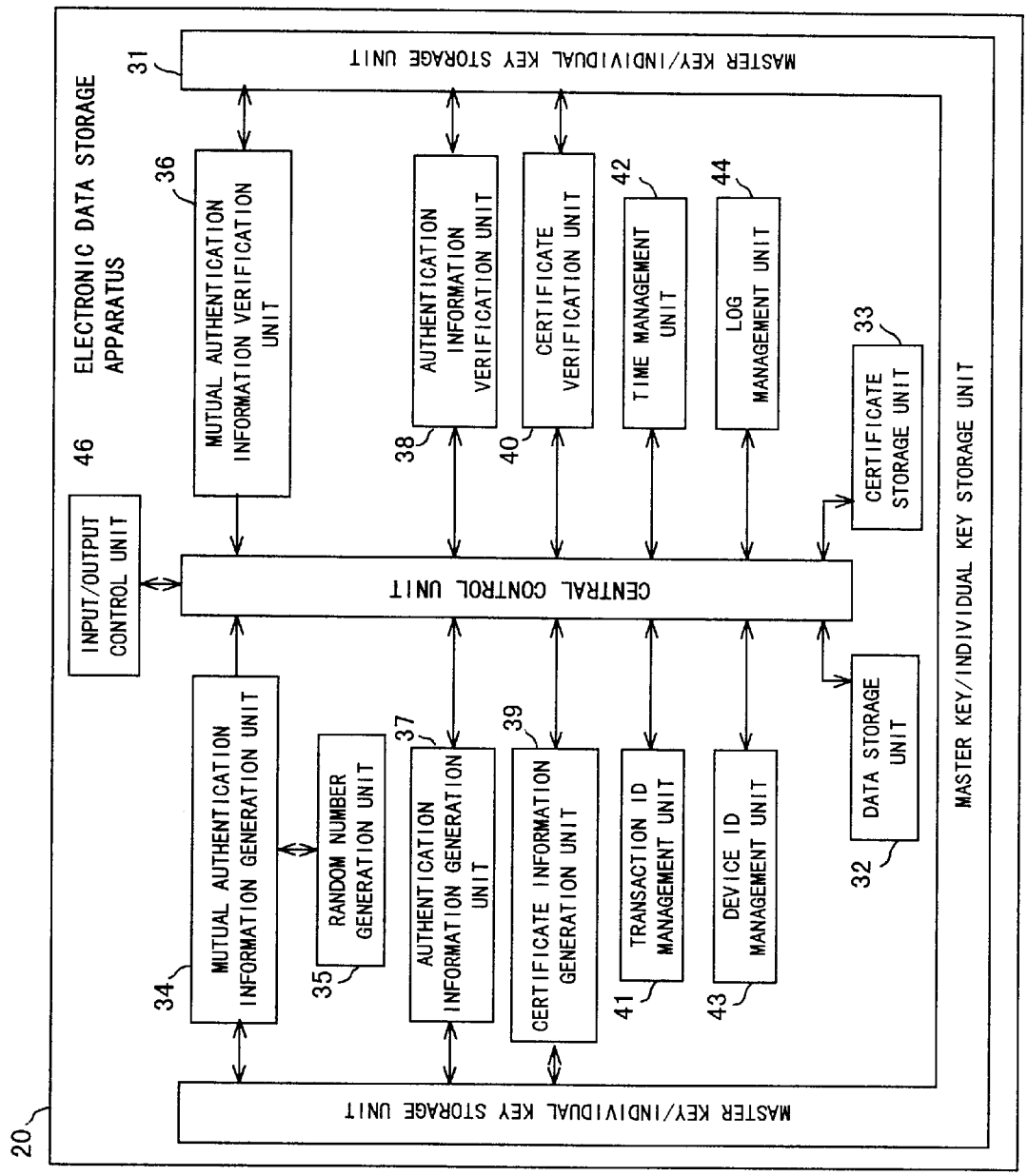
FIG. 13 is a block diagram showing an example of the configuration of an electronic data storage apparatus.

The first embodiment of the present invention is described below in detail by referring to the configuration of the electronic data storage apparatus. FIG. 13 is a detailed block diagram showing an example of the configuration of an electronic data storage apparatus 1. In FIG. 13, the electronic data storage apparatus 20 comprises a master key/individual key storage unit 31 for storing a master key commonly used among a plurality of electronic data storage apparatuses and a unique individual key for each electronic data storage apparatus; a data storage unit 32 for storing electronic data; a certificate storage unit 33 for storing a storage certificate, a data transfer request certificate, and a storage certificate receipt certificate; a mutual authentication information generation unit 34 for generating mutual authentication information used when electronic data storage apparatuses mutually authenticate each other; a random number generation unit 35 for generating a random number required to generate mutual authentication information; a mutual authentication information verification unit 36 for verifying the contents of the mutual authentication information; an authentication information generation unit 37 for generating the authentication information for electronic data; an authentication information verification unit 38 for verifying the contents of authentication information; a certificate information generation unit 39 for generating certificate information such as a data transfer request certificate, a storage certificate, a storage certificate receipt certificate, etc.; a certificate verification unit 40 for verifying the contents of these certificates; a transaction ID management unit 41 for managing the identifier of a transaction such as the transfer of electronic data among electronic data storage apparatuses; a time management unit 42 for managing the time; a device ID management unit 43 for managing the identifier uniquely identifying an electronic data storage apparatus; a log management unit 44 for storing the contents of an event which has occurred in an electronic data storage apparatus; a central control unit 45 for controlling the operations of the entire electronic data storage apparatuses; and an input/output control unit 46 for controlling the input/output of electronic data, etc. to and from an external unit. The electronic data storage apparatus and each component unit are formed by a hard module, etc. having sufficient security to reject the entry of a malicious third party.

Figure 14:
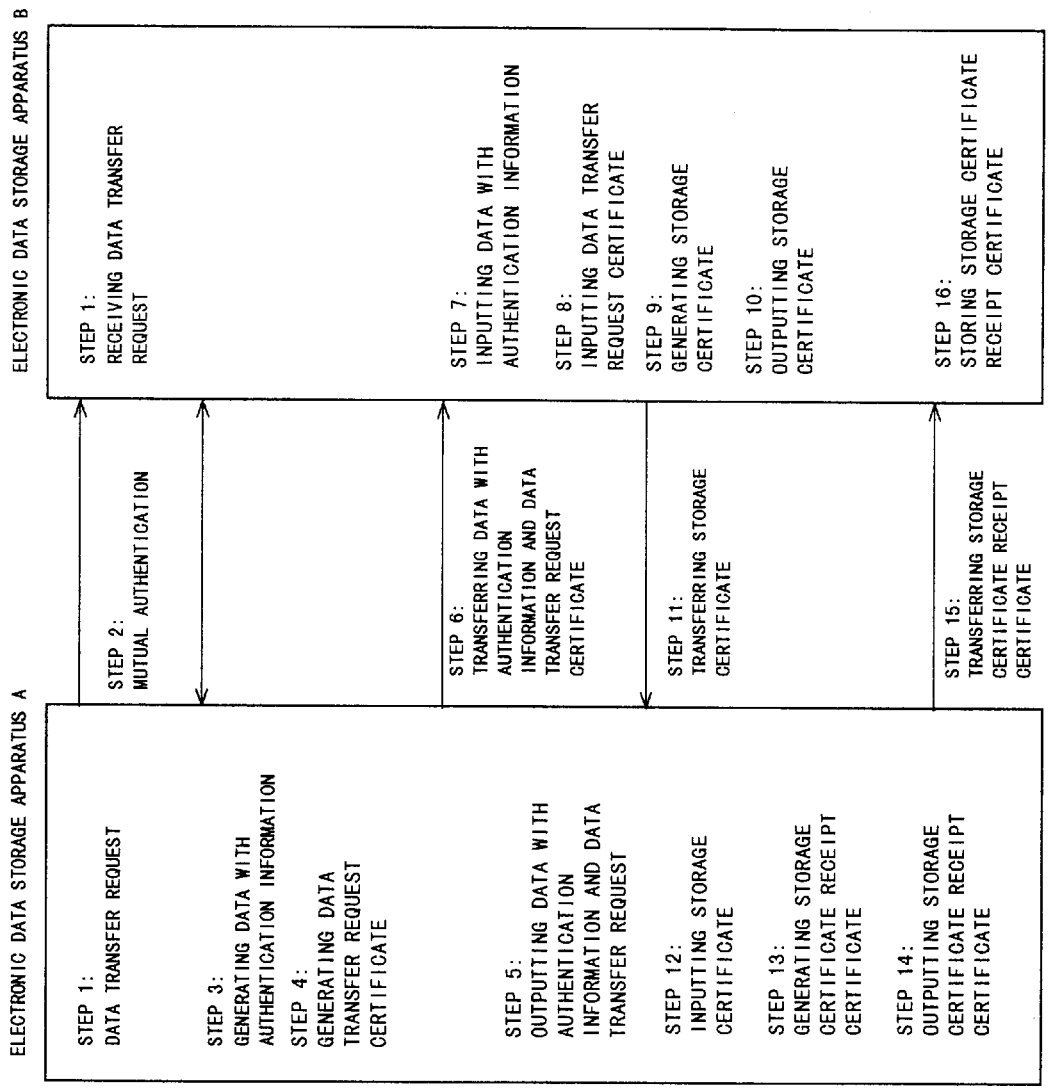
FIG. 14 shows the process flow of electronic data when they are transferred.

FIG. 14 shows the detailed procedure of steps followed when electronic data is transferred among the electronic data storage apparatuses described by referring to FIGS. 11 and 12. In FIG. 14, electronic data is transferred according to the following steps 1 through 16.

Step 1 requesting data transfer, and receiving a data transfer request

Step 2 mutually authenticating electronic data storage apparatuses

Mutual authentication is to authenticate each other between electronic data storage apparatuses using a master key.

Step 3 generating authentication information data

Authentication information data is generated by computing authentication information used to verify the correctness of data from the information, that is, data and time, data identification, etc., and by linking the authentication information with the data.

Step 4 generating a data transfer request certificate

A data transfer request certificate indicating that a request for data transfer has been issued is generated.

Step 5 outputting authentication information data and a data transfer request certificate Outputting authentication information data and a data transfer request certificate is to output the authentication information data and the data transfer request certificate generated in steps 3 and 4 out of the electronic data storage apparatus.

Step 6 transferring authentication information data and a data transfer request certificate Transferring authentication information data and a data transfer request certificate is to transferring authentication information data and a data transfer request certificate through a network and an SCSI cable.

Step 7 inputting authentication information data

Inputting authentication information data is to store in the electronic data storage apparatus again the authentication information data outside the electronic data storage apparatus. At this time, it is verified according to authentication information that data is not illegal. The data is stored if it is not illegal.

Step 8 inputting a data transfer request certificate

When the authentication information data is successfully input in step 7, a data transfer request certificate is input to the electronic data storage apparatus.

Step 9 generating a storage certificate

Generating a storage certificate is to generate a storage certificate guaranteeing that the data is stored in the electronic data storage apparatus in step 7.

Step 10 outputting a storage certificate

Outputting a storage certificate is to output the storage certificate generated in step 9 out of the electronic data storage apparatus.

Step 11 transferring a storage certificate

Transferring a storage certificate is to transfer the storage certificate output in step 10 through a network and an SCSI cable.

Step 12 inputting a storage certificate

Inputting a storage certificate is to input a storage certificate issued when authentication information data is output in step 5, and the data is input to the electronic data storage apparatus again when the authentication information data is input in step 7.

Step 13 generating a storage certificate receipt certificate 28

A storage certificate receipt certificate is generated to indicate that the storage certificate is stored in an electronic data storage apparatus in step 12.

Step 14 outputting a storage certificate receipt certificate

The storage certificate receipt certificate generated in step 13 is output from the electronic data storage apparatus.

Step 15 transferring a storage certificate receipt certificate

A storage certificate receipt certificate is transferred through a network and an SCSI cable.

Step 16 storing a storage certificate receipt certificate.

A storage certificate receipt certificate is stored.

In FIG. 14, when electronic data storage apparatuses mutually authenticate each other in step 2, when authentication information data is generated in step 3, and when authentication information data is input in step 7, processes are performed using a master key commonly used among the electronic data storage apparatuses. When a data transfer request certificate is generated in step 4, when a storage certificate is generated in step 9, and when a storage certificate receipt certificate is generated in step 13, these certificates are generated using an individual key assigned to the two electronic data storage apparatuses A20a and B20b. However, the storage certificate can be generated in step 9 using a master key commonly used among the electronic data storage apparatuses. Thus, a receiver of a storage certificate can decode the data using the master key, and can detect an illegal amendment made to the storage certificate through a network. Furthermore, a master key and an individual key can be generated in association with the identifier of an electronic data storage apparatus, the identifier of a storage medium, etc.

FIGS. 15 through 19 are flowcharts showing the processes in each of the mutual authentication phase in steps 1 and 2, the data transfer phase in steps 3 through 8, the storage certificate phase in steps 9 through 12; and the storage certificate receipt certificate phase in steps 13 through 16 shown in FIG. 14. In FIGS. 15, 16, 18 and 19, A indicates the process of the electronic data storage apparatus A, and B indicates the process of the electronic data storage apparatus B.

Figure 15:
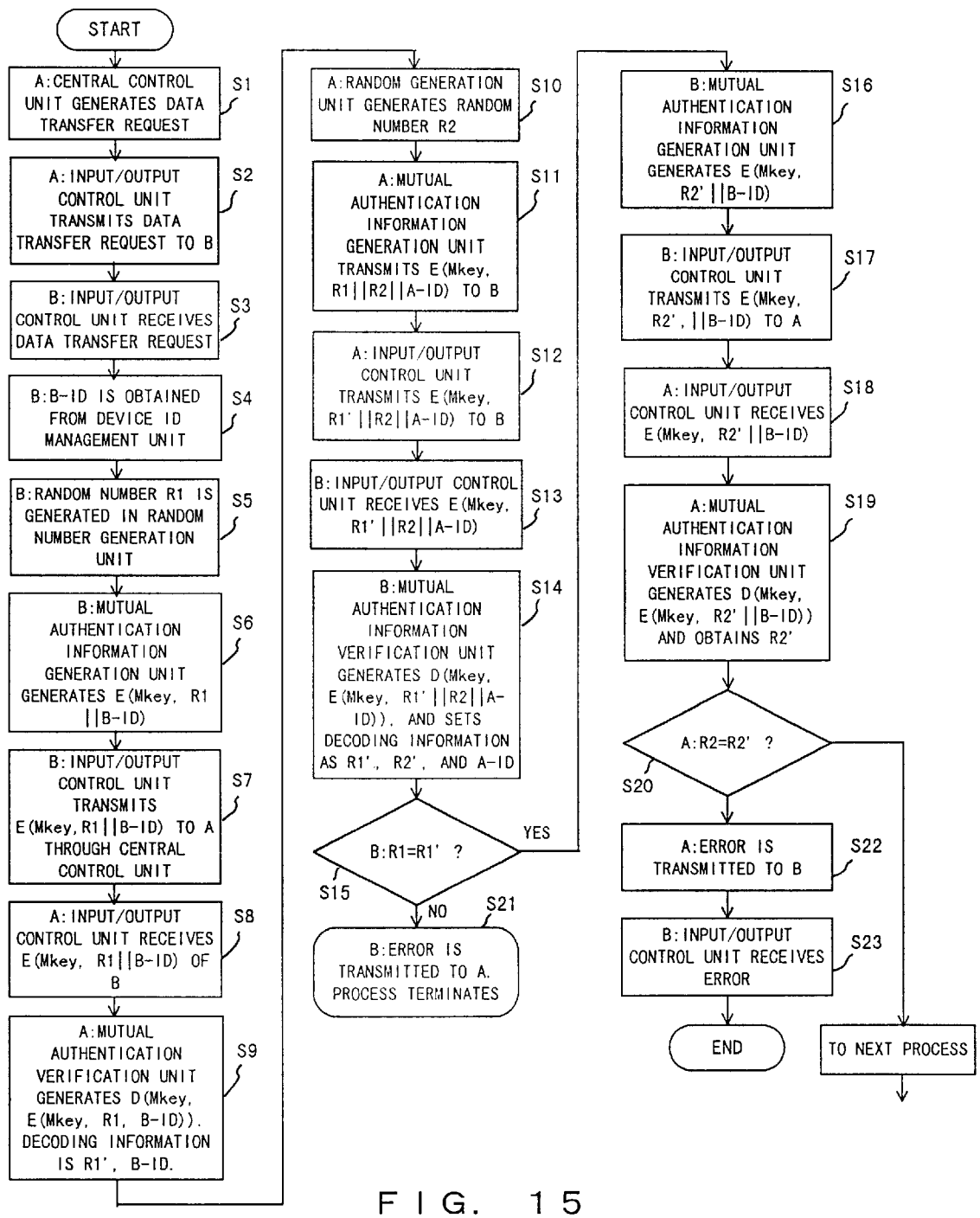
FIG. 15 is a flowchart in the mutual authentication phase.

FIG. 15 is a flowchart showing the process performed in the mutual authentication phase. When the process starts as shown in FIG. 15, a data transfer request is generated by the central control unit 45 in the electronic data storage apparatus A in step S1, and the data transfer request is transmitted to the electronic data storage apparatus B through the input/output control unit 46 in step S2.

In the electronic data storage apparatus B, the input/output control unit 46 receives a data transfer request from the electronic data storage apparatus A in step S3, an identifier B-ID of the electronic data storage apparatus B is obtained from the device ID management unit 43 in step S4, the random number generation unit 35 generates a random number R1 used in the mutual authentication information in step S5, the mutual authentication information generation unit 34 uses the R1 and B-ID as data and generates mutual authentication information E by encrypting the data using a master key (Mkey) in step S6, and the input/output control unit 46 transmits the mutual authentication information E to the electronic data storage apparatus A through the central control unit 45 in step S7.

In the electronic data storage apparatus A, the input/output control unit 46 receives the mutual authentication information E transmitted from the electronic data storage apparatus B in step S8, the mutual authentication information verification unit 36 decodes the received mutual authentication information E using the master key, and obtains the decoded information B-ID and R1' in step S9. Then, in step S10, the random number generation unit 35 generates a random number R2, the mutual authentication information generation unit 34 uses R1', R2, and the identifier A-ID of the storage device A as data, and generates the mutual authentication information E by encrypting the data using the master key in step S11, and the input/output control unit 46 transmits the mutual authentication information E to the electronic data storage apparatus B in step S12.

In the electronic data storage apparatus B, the input/output control unit 46 receives the mutual authentication information E from the storage device A in step S13, the mutual authentication information verification unit 36 decodes the received mutual authentication information, and uses the A-ID, R1', and R2' as decoded information in step S14, and it is determined in step S15 whether or not R1 is equal to R1'.

If it is determined that R1 is equal to R1', then the mutual authentication information generation unit 34 uses R2' and the B-ID as data, and generates the mutual authentication information E by encrypting the data using the master key in step S16, and the input/output control unit 46 transmits the mutual authentication information E to the electronic data storage apparatus A in step S17.

In the electronic data storage apparatus A, the input/output control unit 46 receives the mutual authentication information E in step S18, the mutual authentication information verification unit 36 decodes the received mutual authentication information E, and obtains the B-ID and R2' as decoded information in step S19. Then, it is determined in step S20 whether or not R2 is equal to R2'. If they are equal to each other, it is determined that the mutual authentication has been completed, and control is transferred to the next process.

If it is determined in step S15 that R1 is not equal to R1', then the electronic data storage apparatus B transmits to the electronic data storage apparatus A a notification that an error has been detected, and terminates the process. If the electronic data storage apparatus A determines in step S20 that R2 is not equal to R2', then the electronic data storage apparatus A transmits an error detection notification to the electronic data storage apparatus B in step S22, and the electronic data storage apparatus B receives the error detection notification from the input/output control unit 46 in step S23, determines that the mutual authentication has failed, and terminates the process.

Figure 16:
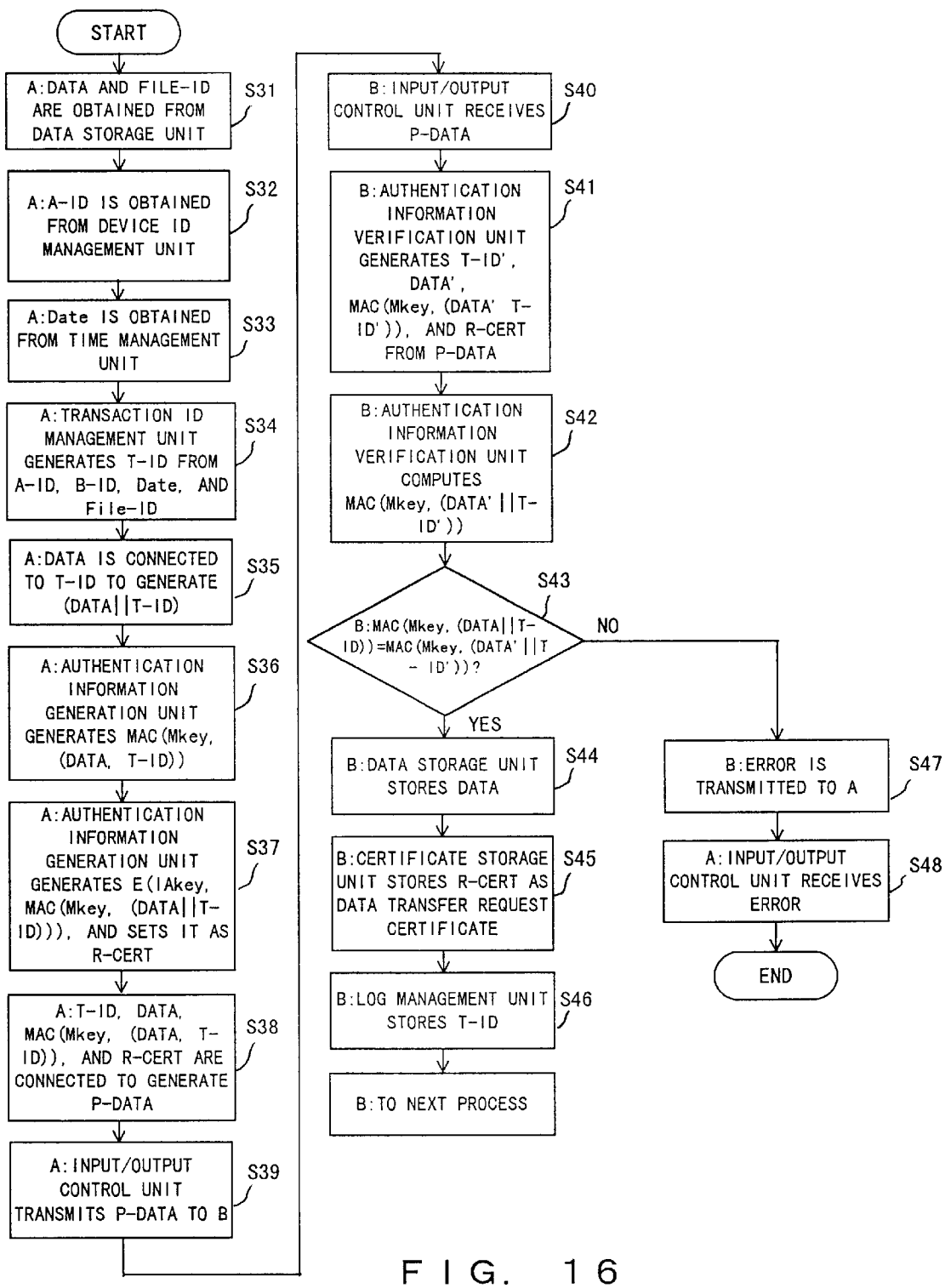
FIG. 16 is a flowchart showing the data transfer phase.

FIG. 16 is a flowchart showing the process performed in the data transfer phase. When the process is started as shown in FIG. 16, the electronic data storage apparatus A obtains electronic data (DATA) and a file identifier (FILE-ID) from the data storage unit 32 in step S31; the identifier A-ID of the electronic data storage apparatus A from the device ID management unit 43 in step S32; and the time (Date) from the time management unit 42 in step S33. In step S34, the transaction ID management unit 41 generates the transaction identifier T-ID using the identifier B-ID of the electronic data storage apparatus B to which the electronic data is to be transferred. In step S35, the electronic data is linked to the transaction identifier. DATA indicates information containing data attribute information such as an owner, a retention period, access control information, original information, etc.

Then, in step S36, the authentication information generation unit 37 of the electronic data storage apparatus A uses as data the result of linking the electronic data with the transaction identifier (T-ID), and generates an authentication information MAC (Message Authentication Code) using a master key (Mkey). In step S37, the certificate information generation unit 39 uses as data the authentication information MAC and the information E is generated by encrypting the data using an individual key (Ikey). The information E is called a data transfer request certificate R-CERT. In step S38, package data P-DATA is generated by linking the transaction identifier, the electronic data, the authentication information, and the data transfer request certificate. In step S39, the input/output control unit 46 transmits the package data to the electronic data storage apparatus B. The authentication information can be generated by associating the T-ID with the attribute information of the data.

In the electronic data storage apparatus B, the input/output control unit 46 receives the package data in step S40, and the authentication information verification unit 38 obtains from the package data the transaction identifier T-ID', the electronic data DATA', the authentication information MAC, and the data transfer request certificate R-CERT in step S41. In step S42, the authentication information verification unit 38 uses the DATA' and T-ID' as data and computes the authentication information MAC using a master key. In step S43, it is determined whether or not the authentication information MAC obtained in step S41 is equal to the authentication information MAC computed in step S42. If yes, the data storage unit 32 stores the electronic data in step S44. In step S45, the certificate storage unit 33 stores the data transfer request certificate. In step S46, the transaction identifier is stored in the log management unit 44, and control is transferred to the next process.

If it is determined in step S43 that the two pieces of authentication information MAC are not equal to each other, then an error detection notification is transmitted from the electronic data storage apparatus B to the electronic data storage apparatus A in step S47, and the storage device A receives the error notification through the input/output control unit 46 in step S48, thereby terminating the process.

FIG. 17 shows the method of computing the authentication information MAC through the authentication information generation unit 37 shown in FIG. 13. For example, in step S36 shown in FIG. 16, the data obtained by linking the DATA with the T-ID is used as original data to compute the MAC using a master key. The encryption method DES (Data Encryption Standard) established by the U.S. Standard Association is adopted in computing the MAC. In this encryption method, the encrypting/decrypting operations can be processed in a single LSI (Large Scale Integrated unit).

In FIG. 17, the original data is divided into a plurality of 64-bit blocks M1, M2, . . . , Mn. The DES process is performed on the first 64-bit block M1 using a master key in step S50. The exclusive OR is obtained between the resultant 64-bit data and the subsequent 64-bit block M2 in step S51. Then, the DES process is performed again on the result using a master key in step S52, and the process is repeated. Finally, the exclusive OR is obtained between the 64-bit block Mn and the result of the preceding DES process is obtained in step S53. Furthermore, in step S54, the DES process is performed on the obtained result using a master key. In the finally obtained 64 bits, the higher 32 bits are used as the authentication information MAC in step S55, thereby terminating the process. The computation of the MAC described in this embodiment can also be performed using a general system, that is, a triple DES, using another algorithm, and using an hMAC (hashed MAC) generated by associating the hash value of data.

FIG. 18 is a flowchart showing the process in the storage certificate phase. When the process starts as shown in FIG. 18, the certificate information generation unit 39 shown in FIG. 13 obtains the transaction ID of the input authentication information data in step S61. In step S62, the identification information B-ID of the electronic data storage apparatus 20b is obtained from the device ID management unit 43. In step S63, the current time 'Date' is obtained from the time management unit 42. In step S64, the data obtained by linking the transaction ID, the device ID, the time, and the data transfer request certificate R-CERT stored in the certificate storage unit 33 in step S45 shown in FIG. 16 is encrypted using an individual key IBkey, and the result is set as S-CERT.

In step S65, the input/output control unit 46 of the electronic data storage apparatus 20b transmits the S-CERT to the electronic data storage apparatus A20a. In step S66, the input/output control unit 46 of the electronic data storage apparatus A20a receives the S-CERT. In step S67, the S-CERT is stored as a storage certificate by the certificate storage unit 33 in the electronic data storage apparatus A20a. In step S68, the log management unit 44 records the storage of the S-CERT, and control is passed to the next process.

Figure 19:
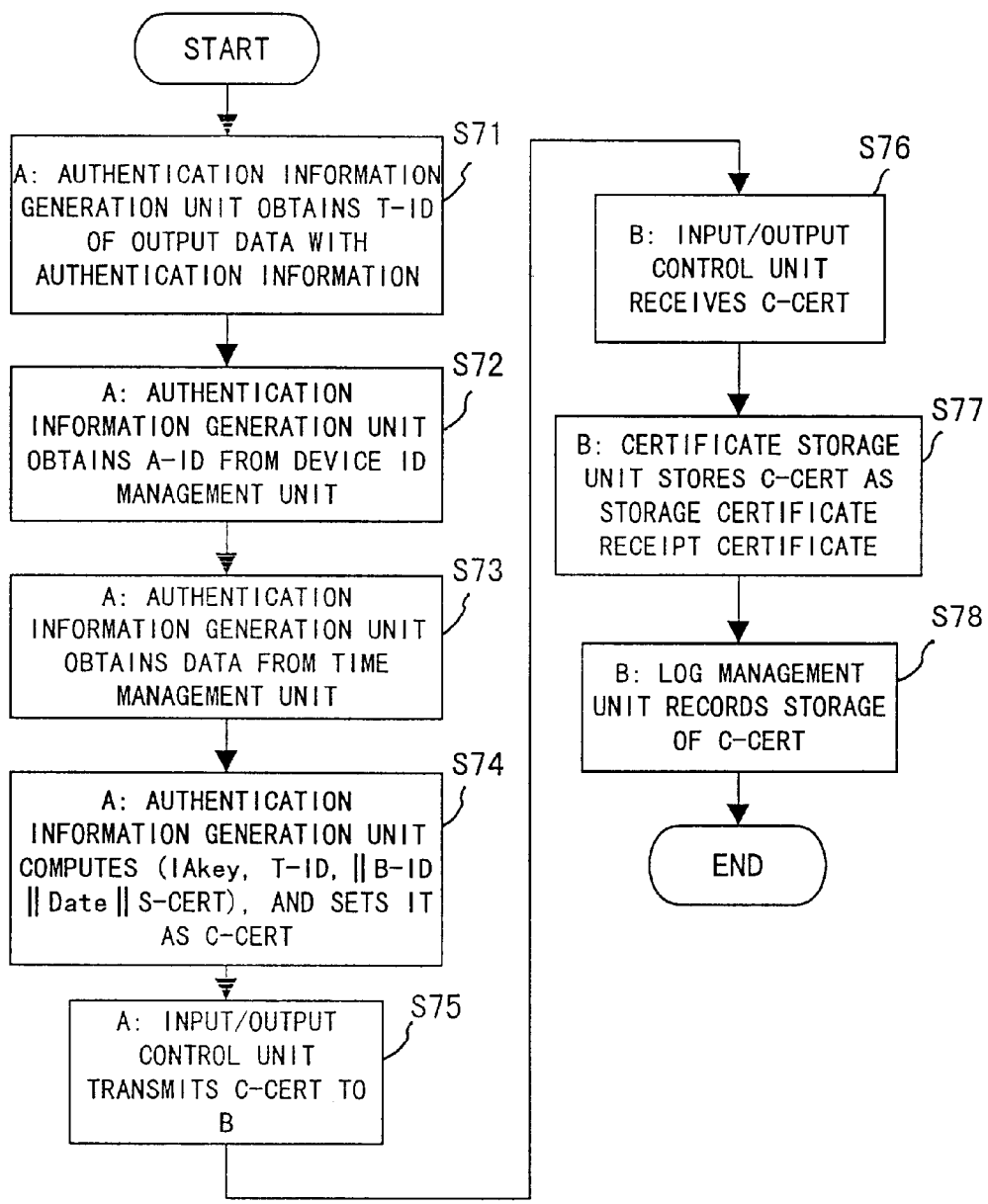
FIG. 19 is a flowchart showing the process in the storage certificate receipt certificate phase.

FIG. 19 is a flowchart showing the process in the storage certificate receipt certificate phase. In FIG. 19, the electronic data storage apparatus A20a generates a storage certificate receipt certificate, and transmits it to the electronic data storage apparatus B20b.

When a process is started as shown in FIG. 19, a transaction identifier T-ID of the output authentication information data is obtained by the certificate information generation unit 39 of the electronic data storage apparatus A20a in step S71. In step S72, a device identifier A-ID of the electronic data storage apparatus A20a is obtained from the device ID management unit 43. In step S73, the current time 'Date' is obtained from the device ID management unit 43. In step S74, the data obtained by linking the transaction ID, the device ID, the time, and the storage certificate S-CERT stored in the certificate storage unit 33 in step S67 shown in FIG. 18 is encrypted using an individual key IAkey of the electronic data storage apparatus A20a, and the result is set as a storage certificate receipt certificate C-CERT.

In step S75, the input/output control unit 46 of the electronic data storage apparatus A20a transmits the storage certificate receipt certificate C-CERT to the electronic data storage apparatus B20b. The C-CERT is received by the input/output control unit 46 of the electronic data storage apparatus B20b in step S76, and is stored as a storage certificate receipt certificate in the certificate storage unit 33 of the electronic data storage apparatus B20b in step S77. In step S78, the log management unit 44 records the storage of the storage certificate receipt certificate C-CERT, thereby terminating the data transfer process.

As described above, data can be transferred between the two electronic data storage apparatuses A and B. It is obvious that the user can simply retrieves authentication information data from the electronic data storage apparatus, input the authentication information data to the electronic data storage apparatus, and obtain a storage certificate for each of the operations. In this case, the electronic data with authentication information can be encrypted for output using a master key to prevent the data from being illegally amended or deleted.

Described below is the second embodiment according to the present invention. According to the first embodiment, an electronic data storage apparatus has its own master key, and is an independent device capable of transfer electronic data to and from another electronic data storage apparatus. According to the second embodiment of the present invention, the electronic data storage apparatus, which is an example of an electronic data storage function, operates after being assigned an authorization function for authorizing an electronic data storage function, for example, after being assigned information and a master key for uniquely identifying an electronic data storage function by a public authorization organization.

Figure 20:
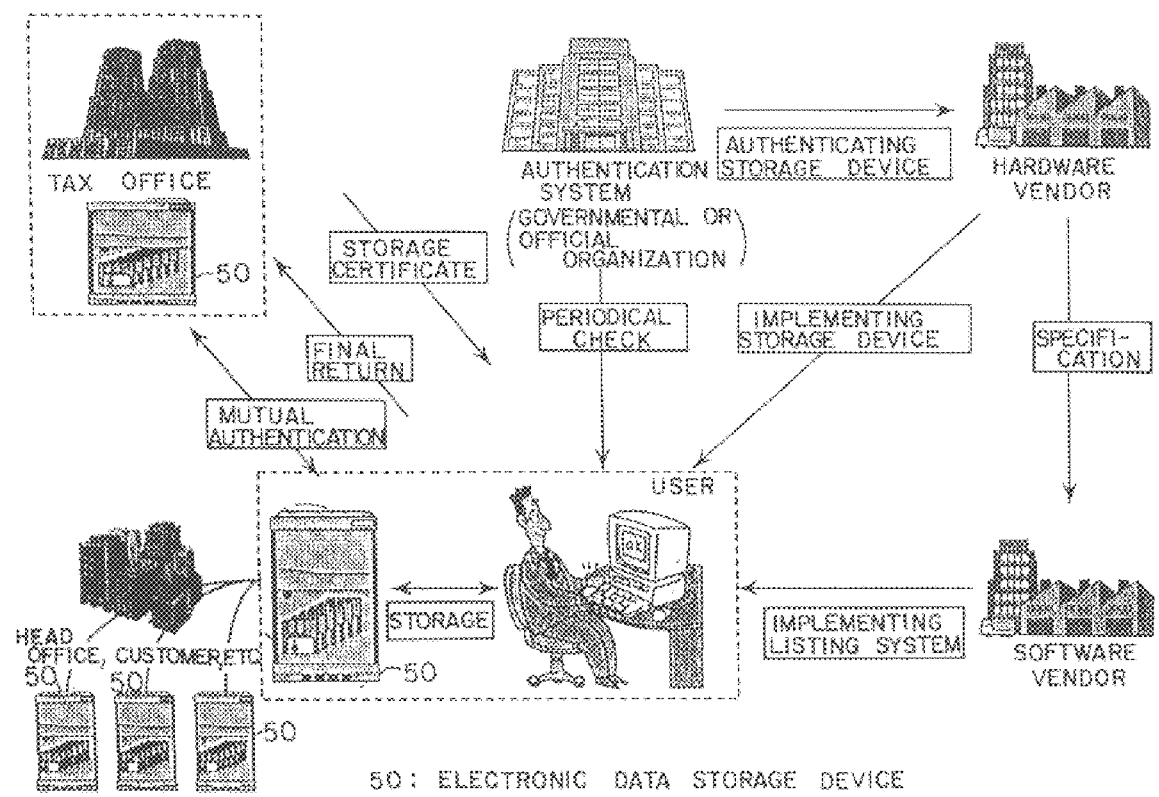
FIG. 20 shows an example of the electronic data storage system according to the second embodiment of the present invention.

FIG. 20 shows an electronic data storage system according to the second embodiment of the present invention using a listing process as an example. In FIG. 20, an electronic data storage apparatus produced by a hardware manufacturer is authorized by an authorization organization such as a governmental or official organization. The generated storage device is provided for the user. Additionally, the hardware manufacturer assigns the specification of each electronic data storage apparatus to a software manufacturer. A listing system according to the specification is introduced from the software manufacturer to the user. The electronic data storage apparatus introduced to the user is periodically checked, for example, every second or third year, by the authorization organization.

After the user's electronic data storage apparatus and, for example, the electronic data storage apparatus in the taxation office mutually authenticate each other, a final return form is transmitted as electronic data from the user to the taxation office. In response to the final return form, the taxation office transmits a storage certificate to the user.

Figure 21:
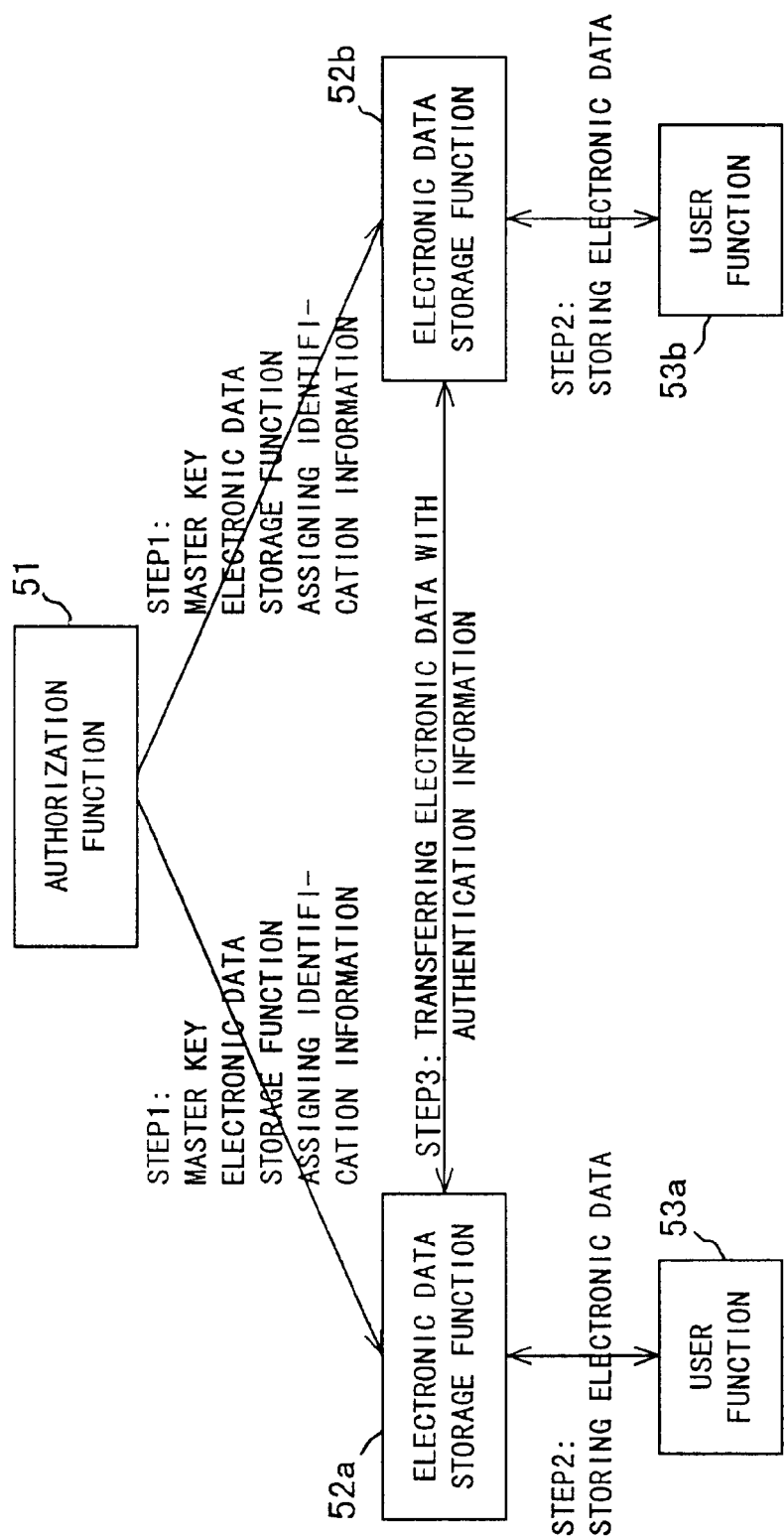
FIG. 21 shows the entire operation of the electronic data storage system according to the second embodiment of the present invention.

FIG. 21 shows the entire operation of the electronic data storage system according to the second embodiment of the present invention. An electronic data storage function according to the second embodiment of the present invention can be a combination of hardware and software (or firmware) provided as a single unit such as an electronic data storage apparatus. It also can be simply software supplied to the user so that the user can obtain an electronic data storage apparatus using the software and his or her own personal computer. Therefore, using all these functions can be referred to as electronic data storage functions. Similarly, the word 'authorization function' replaces the word 'authorization organization', for example, the word 'user function' can replace the word 'user's personal computer'.

In FIG. 21, an authorization function 51 assigns a master key and electronic data storage function identification information to electronic data storage functions 52a and 52b in step 1 and 1'. The assignment is performed after it is confirmed that these electronic data storage function satisfy the specification required by the authorization function 51. It is obvious that the master key is commonly used, but different pieces of identification information are assigned as electronic data storage function identification information to the electronic data storage functions 52a and 52b.

Actually, as described later, the authorization function 51 offline transmits a master key and electronic data storage function identification information using a medium such as a floppy disk, etc. to, for example, a hardware vendor which generates the electronic data storage function. The master key and electronic data storage function identification information transmitted using the medium are incorporated when the hardware vendor generates the electronic data storage function.

In step 2 and 2' shown in FIG. 21, user functions 53a and 53b store electronic data in the electronic data storage functions 52a and 52b respectively to allow the electronic data to maintain sufficient legal evidence. When the electronic data is stored, the electronic data storage functions 52a and 52b relate as the attribute information of the electronic data the electronic data identification information, etc., that is, the identification information about the electronic data generated according to, for example, illegal amendment detection information, the retention period, the original/copy information, electronic data storage function identification information, etc. Then, the electronic data storage functions 52a and 52b generate authentication information for the electronic data using a master key.

In step 3 shown in FIG. 21, electronic data with authentication information is transferred between the electronic data storage functions 52a and 52b. When the electronic data is transferred, the information about which is transferred, an original or a copy, and the electronic data storage function identification information at the destination are stored in the source electronic data storage function. The information about whether the data is the original or a copy, the source electronic data storage function identification information, etc. are written to the authentication information. In the electronic data storage function at the destination, electronic data is stored with the authentication information after the contents of the authentication information are verified using a master key.

Figure 22:
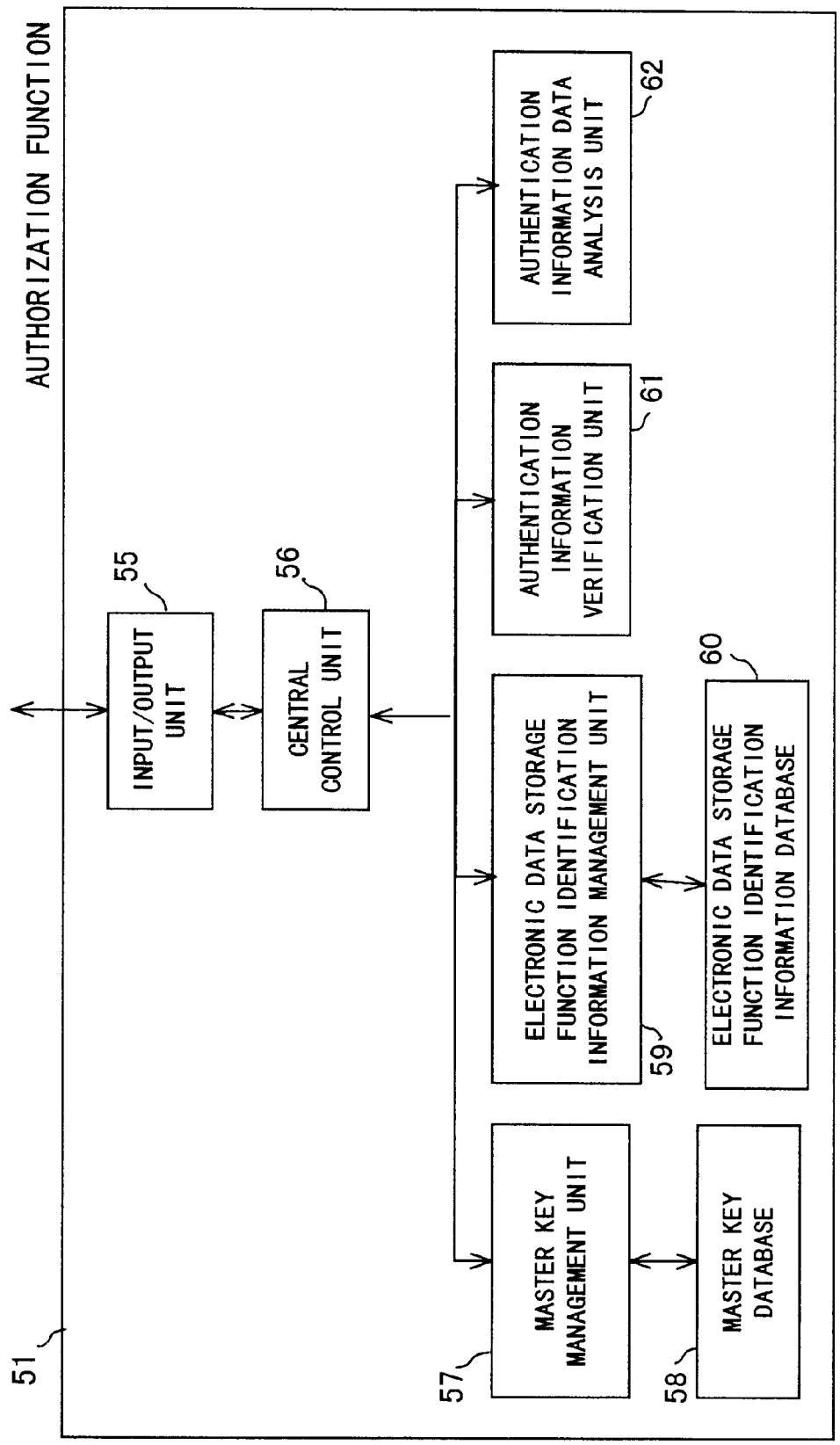
FIG. 22 is a block diagram showing the configuration of the authorization function according to the second embodiment of the present invention.

FIG. 22 is a block diagram showing the authorization function 51 shown in FIG. 21. In FIG. 22, the authorization function 51 comprises an input/output unit 55 for inputting/outputting data; a central control unit 56 for controlling the entire authorization function 51; a master key management unit 57 for generating and managing a master key; a master key database 58 for storing a master key; an electronic data storage function identification information database 60 for storing electronic data storage function identification information; an authentication information verification unit 61 for verifying authentication information; and an authentication information data analysis unit 62 for analyzing the electronic data storage function identification information and original information in the authentication information data.

FIG. 23 is a block diagram showing the configuration of the electronic data storage function 52. In FIG. 23, the electronic data storage function 52 comprises an input/output unit 65 for inputting/outputting data; a central control unit 66 for controlling the entire system; a master key storage unit 67 for storing a master key; an electronic data storage function identification information storage unit 68 for storing electronic data storage function identification information uniquely identifying the electronic data storage function; a data storage unit 69 for storing electronic data; an authentication information storage unit 70 for storing authentication information; a log storage unit 71 for storing a log of an event in the electronic data storage function; an authentication information generation unit 72 for generating authentication information; an electronic data identification information generation unit 73 for generating identification information for electronic data according to electronic data storage function identification information and a count value output from a counter 74; the counter 74 for generating a number assigned to data; an original/copy information generation unit 75 for generating information indicating whether the electronic data is the original or a copy; a log generation unit 76 for generating a log of an event in the electronic data storage function; a clock unit 77 for outputting the current time; a data list display response unit 78 in the electronic data storage function for generating and outputting a list of electronic data stored at a request from an external unit; an authentication information data input process unit 79 for processing authentication information data for input; an authentication information data output process unit 80 for outputting stored data as authentication information data; and an authentication information verification unit 81 for verifying authentication information.

Figure 24:
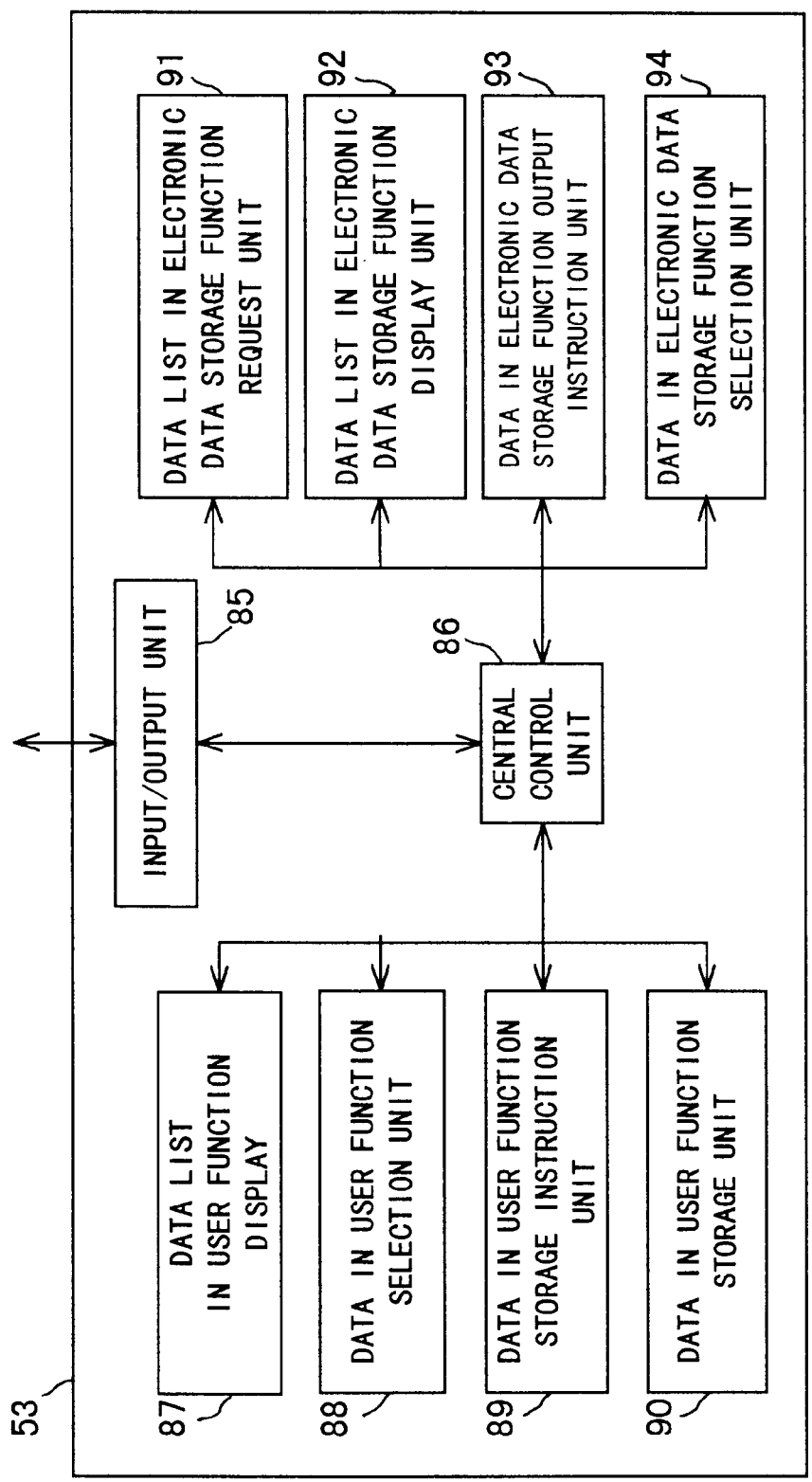
FIG. 24 is a block diagram showing the configuration of the user function.

FIG. 24 is a block diagram showing the configuration of the user function 53. In FIG. 24, the user function 53 comprises an input/output unit 85 for inputting/outputting data; a central control unit 86 for controlling the entire system; a data list in a user function display unit 87 for displaying a list of data in a user function; a data in a user function selection unit 88 for selecting data in a user function; a data in a user function storage instruction unit 89 for specifying the storage of the data generated by the user; a data in a user function storage unit 90 for storing the data generated by the user; a data list in an electronic data storage function request unit 91 for requesting a list of the data stored in the electronic data storage function; a data list in an electronic data storage function display unit 92 for displaying the data list; a data in an electronic data storage function output instruction unit 93 for specifying the output of the data in the electronic data storage function; and a data in the electronic data storage function selection unit 94 for selecting the data store d in the electronic data storage function.

Figure 25:
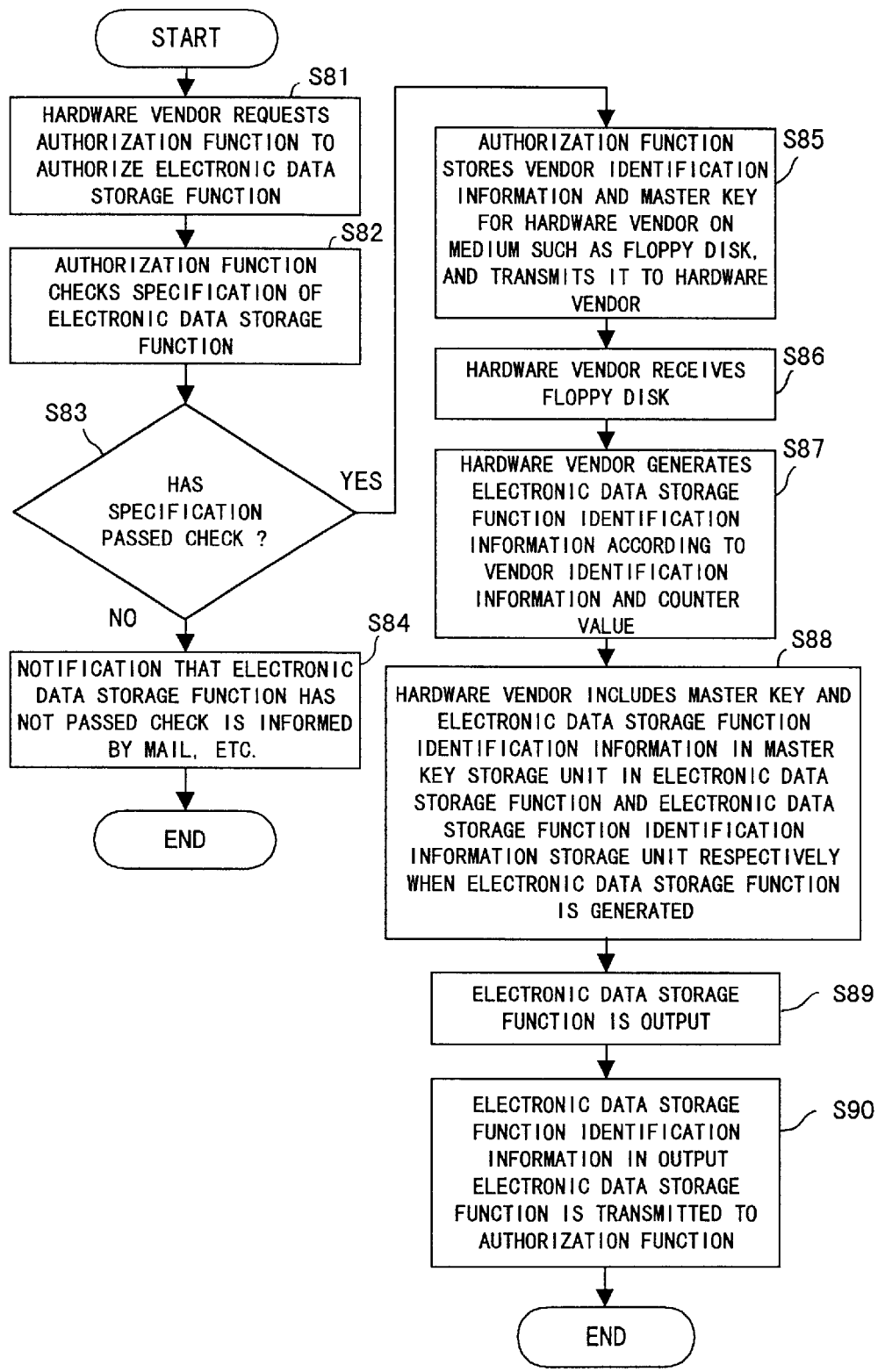
FIG. 25 is a flowchart showing the process of assigning a master key and electronic data storage function identification information to the electronic data storage function.

FIG. 25 is a flowchart showing the process of assigning a master key and electronic data storage function identification information by an authorization function to an electronic data storage function. When the process is started as shown in FIG. 25, an authorization function receives from a hardware vendor a request for authorizing an electronic data storage function in step S81. In step S82, the specification of the electronic data storage function is checked. This checking process is described later. In step S83, it is determined whether or not the specification has passed the check. If not, the notification that the electronic data storage function cannot be accepted is issued by mail, etc. in step S84, thereby terminating the process.

If the specification has passed the check, the vendor identification information and a master key for the hardware vendor are stored on the medium such as a floppy disk, etc. and are sent to the hardware vendor in step S85. In step S86, the floppy is received by the hardware vendor. In step S87, the hardware vendor generates electronic data storage function identification information using the vendor identification information and a counter. In step S88, when an electronic data storage function, for example, an electronic data storage apparatus, is generated, a master key is incorporated into a master key storage unit, and the electronic data storage function identification information is incorporated into the electronic data storage function identification information storage unit. In step S89, the electronic data storage function is output. In step S90, the electronic data storage function identification information of the output electronic data storage function is delivered to the authorization function, thereby terminating the process. This is an embodiment of the present invention, and the authorization function can first specify the electronic data storage function identification information and notify the hardware vendor of the information.

Figure 26:
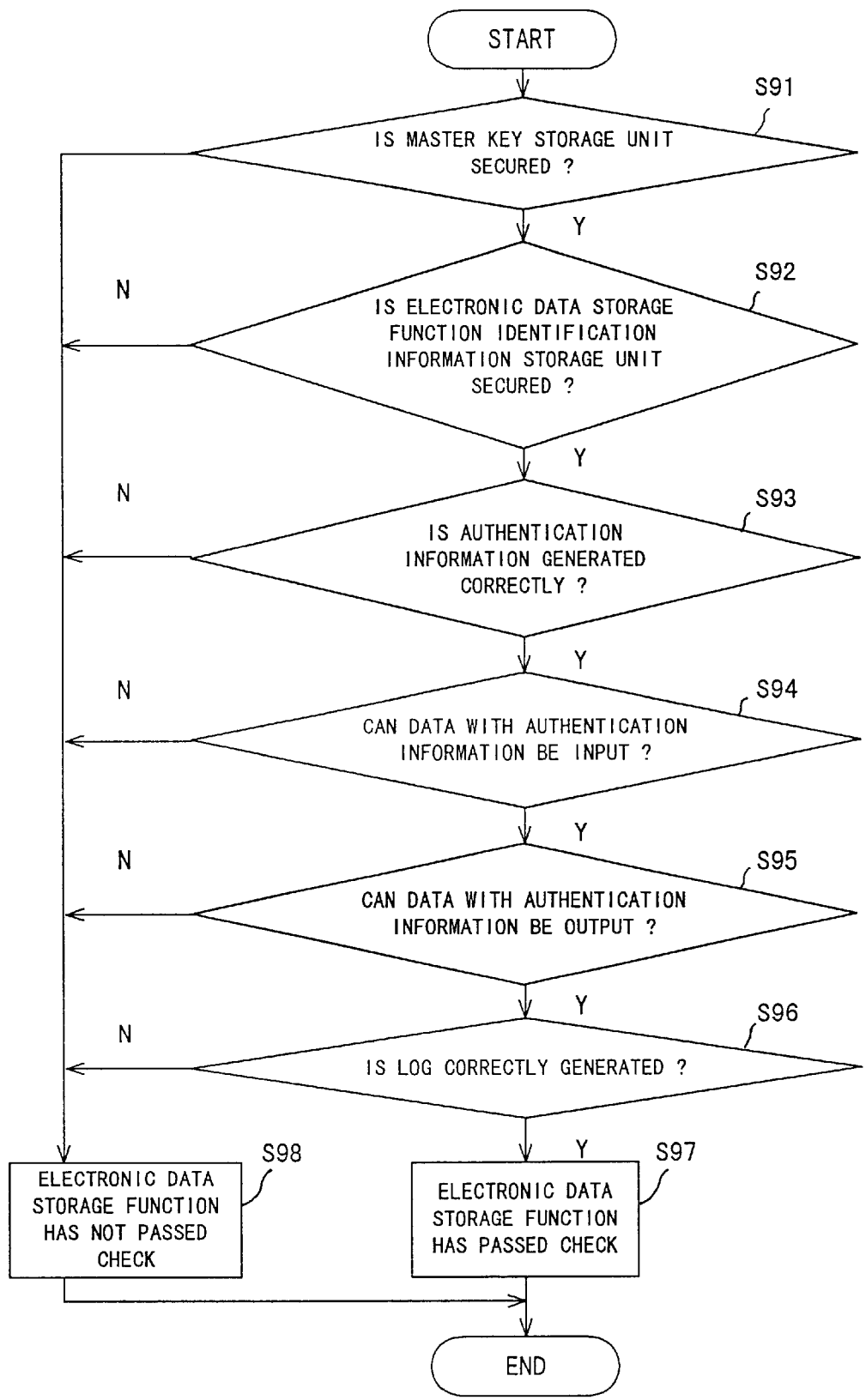
FIG. 26 is a flowchart showing the process of checking the specifications of the electronic data storage function.

FIG. 26 shows step S82 shown in FIG. 25. That is, FIG. 26 is a flowchart showing the process of the authorization function checking the specification of the electronic data storage function. When the process is started as shown in FIG. 26, the following processes are performed. That is, it is determined in step S91 whether or not the master key storage unit is safely controlled. It is determined in step S92 whether or not the electronic data storage function identification information storage unit is safely controlled. It is determined in step S93 whether or not the authentication information is correctly generated. It is determined in step S94 whether or not the data with authentication information can be input. It is determined in step S95 whether or not the data with authentication information can be output. It is determined in step S96 whether or not the log can be correctly generated. If the condition is satisfied in each of the processes, it is determined in step S97 that the specification has passed the check. If any one of the required conditions is not satisfied, it is determined in step S98 that the specification is not accepted, thereby terminating the process.

FIG. 27 is a flowchart showing the process of updating the master key assigned from the authorization function to the electronic data storage function. As described above, an effective period is set for the master key. First, it is determined in step S100 whether or not there is any master key going to expire. If not, the process terminates immediately. If there is any master key going to expire, then a new master key is generated by the authorization function in step S101. The master key is entered in the master key database in step S102. In step S103, the hardware vendor is informed of the master key. In step S104, the hardware vendor updates the master key of the electronic data storage function, thereby terminating the process. Also in step 103, the user having the electronic data storage apparatus, not the vendor, can be directly informed of the master key.

FIG. 28 shows an example of the contents stored in the master key database 58 in the authorization function 51 shown in FIG. 22. FIG. 28 shows that the effective period of the master key A spans, for example, from Jan. 1, 1995 to Dec. 31, 1996, and that the distribution destinations include the hardware vendors 1 through 3.

FIG. 29 shows an example of the contents stored in the electronic data storage function identification information database 60 shown in FIG. 22. The database stores the vendor identification information described above in step S86, and the vendor assigned number corresponding to the count value of the counter. The information and the number are stored for each vendor name.

Figure 30:
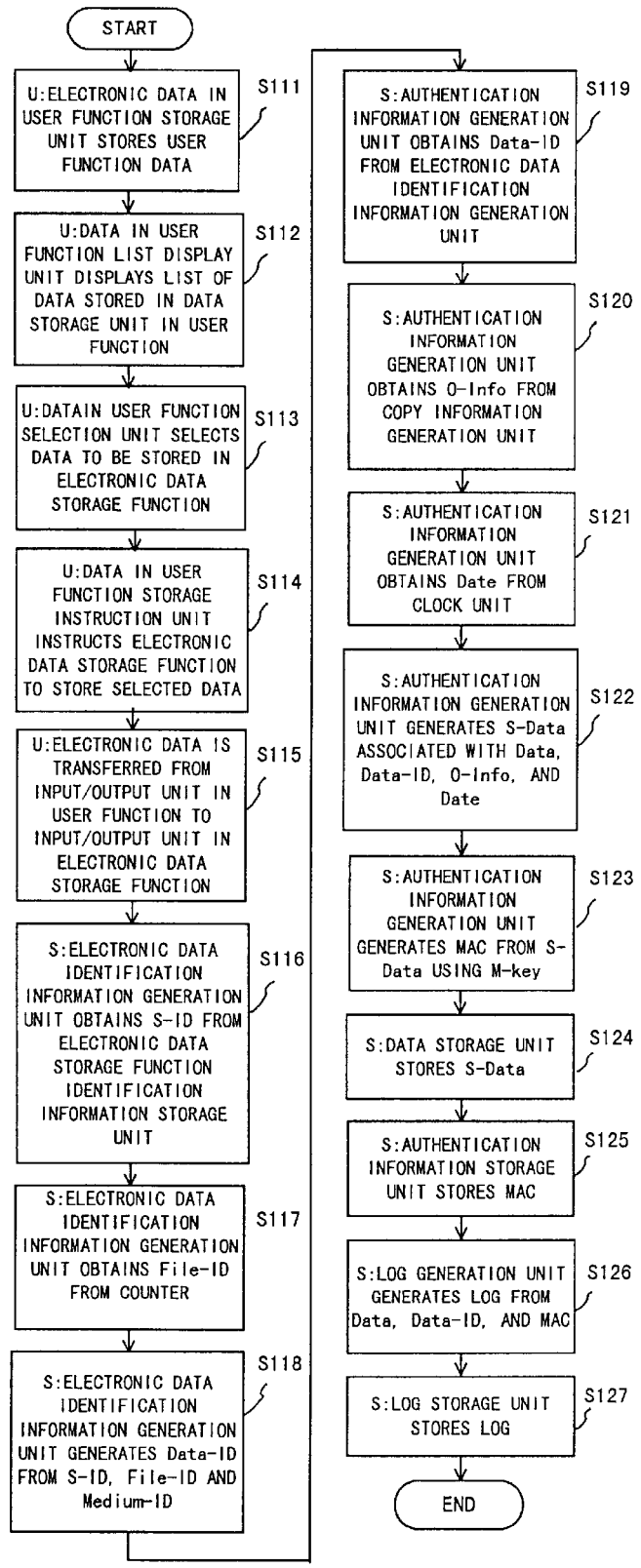
FIG. 30 is a flowchart showing the data storage process from the user function to the electronic data storage function.

FIG. 30 is a flowchart showing the process of storing data by the user function in the electronic data storage function. In FIG. 30, U indicates the process by the user function, and S indicates the process by the electronic data storage function.

When the process is started as shown in FIG. 30, for example, the user function data generated by the user is stored in the data in the user function storage unit 90 in step S111. In step S112, the data list in the user function display unit 87 displays the data list of data stored in the data in the user function storage unit 90. In step S113, the data selection unit 88 in the user function selects the data to be stored in the electronic data storage function. In step S114, the data in the user function storage instruction unit 89 instructs the electronic data storage function to store the electronic data selected in step S113. In step S115, the electronic data is transferred from the input/output unit 85 of the user function 53 to the input/output unit 65 of the electronic data storage function 52.

In the electronic data storage function 52, the electronic data identification information generation unit 73 obtains the device identifier S-ID as identification information from. the electronic data storage function identification information storage unit 68 in step S116. In step S117, a File-ID is obtained as the number of data used in generating the electronic data identification information from the counter 74. In step S118, the electronic data identification information Data-ID is generated from the device identifier S-ID, the data number and Medium-ID.

Then, in step S119, the authentication information generation unit 72 obtains the electronic data identification information Data-ID from the electronic data identification information generation unit 73. In step S120, for example, an O-Inf 50 indicating the original is obtained from the original/copy information generation unit 75. In step S121, the current time 'Date' is obtained from the clock unit 77. In step S122, the data selected in step S113, the electronic data identification information Data-ID generated in step S118, the information indicating the original, and the current time are associated to generate an S-Data as the original data of the authentication information. In step S123, authentication information MAC is generated using a master key from the original data.

Then, in step S124, the electronic data storage unit 69 in the electronic data storage function 52 stores the S-Data. In step S125, the authentication information storage unit 70 stores the MAC. In step S126, the log generation unit 76 generates a log from the time, electronic data identification information Data-ID, and authentication information. The contents of the log generated by the log generation unit 76 are substantially the same as the authentication information generated by the authentication information generation unit 72 in steps S122 and S123. This means that the authentication information generation unit 72 generates the authentication information associated with the log, that is the history information, when the authentication information is generated. In step S127, the log storage unit 71 stores the log, thereby terminating the process.

Figure 31:
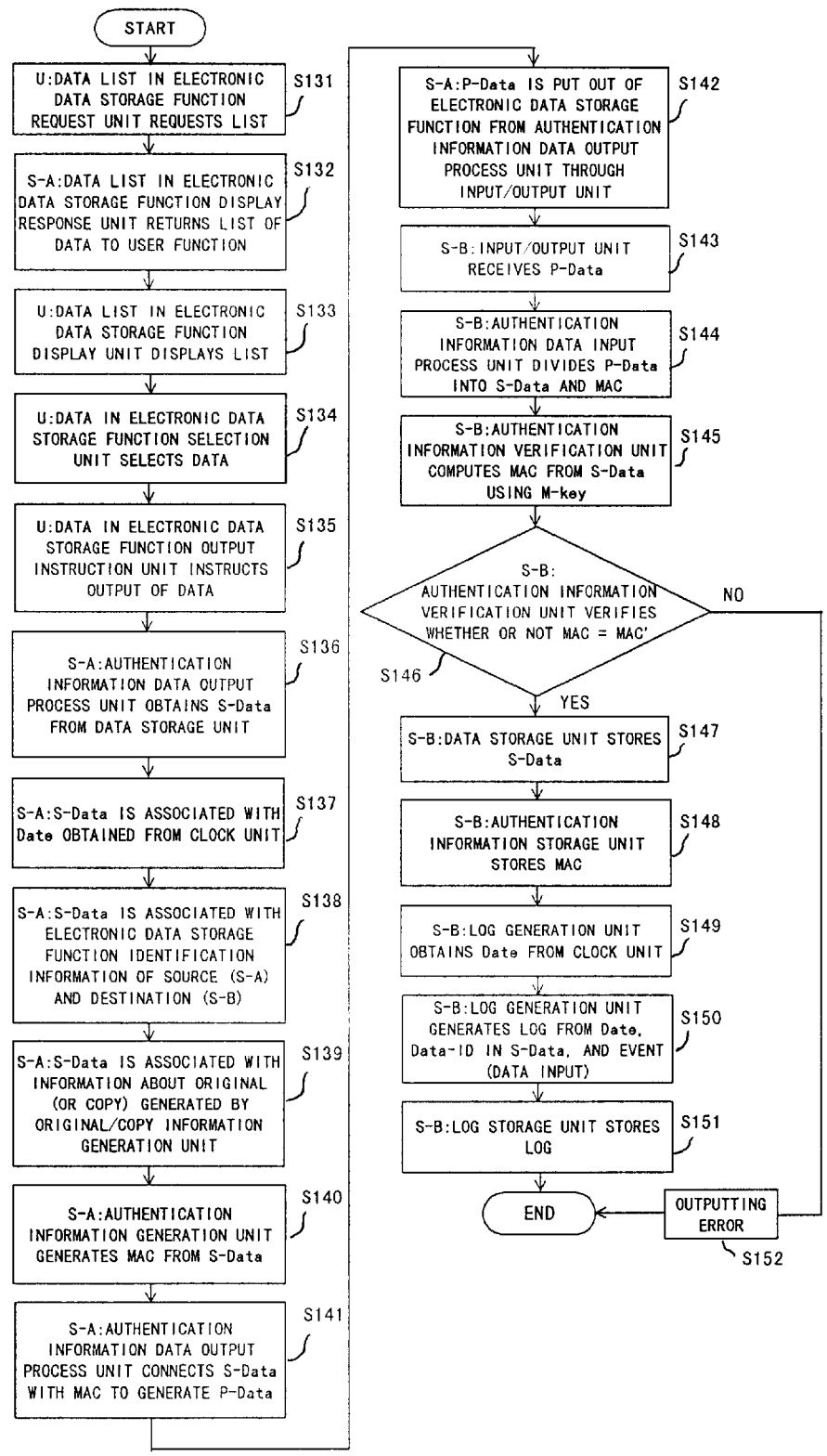
FIG. 31 is a flowchart showing the electronic data transfer process between electronic data storage functions.

FIG. 31 is a flowchart showing the process of transferring the data between electronic data storage functions. In FIG. 31, the data stored in an electronic data storage function A is transferred to another electronic data storage function B. U indicates a user function. S-A indicates an electronic data storage function A. S-B indicates an electronic data storage function B.

When the process is started as shown in FIG. 31, the data list in the electronic data storage function request unit 91 of the user function 53 requests the electronic data storage function A to issue a list of data. In step S132, the data list in the electronic data storage function display response unit 78 of the electronic data storage function A returns the data list to the user function. In step S133, the data list in the electronic data storage function display unit 92 in the user function displays the list. In step S134, the data in the electronic data storage function selection unit 94 selects the electronic data to be transferred. In step S135, the data in the electronic data storage function output instruction unit 93 instructs the electronic data storage function A to output data.

In the electronic data storage function A, the authentication information data output process unit 80 obtains the S-Data from the data storage unit 69 in step S136. In step S137, the S-Data is related to the current time obtained from the clock unit 77, that is, the time 'Date' recorded when data is output. In step S138, the S-Data is related to the electronic data storage function identification information of the source, that is, the electronic data storage function A, and of the destination storage function B. In step S139, the S-Data is related to the information indicating the original or a copy generated by the original/copy information generation unit 75. In step S140, the authentication information generation unit 72 generates authentication information MAC from the S-Data. In step S141, the authentication information data output process unit 80 connects the S-Data to the MAC to generate package data (P-Data). In step S142, the generated data is put out of the electronic data storage function through the input/output unit 65.

In the electronic data storage function B, the input/output unit 65 receives the package data in step S143. In step S144, the authentication information data input process unit 79 divides the package data into the S-Data and the MAC. In step S145, the authentication information verification unit 81 computes authentication information MAC' from the S-Data using a master key. It is determined in step S146 whether or not the computed MAC' equals the MAC divided in step S144. If not, an error message is output in step S147, thereby terminating the process. In this case, the causes of the error can be, for example, illegal amendments to the data through the network, different master keys between the two electronic data storage functions A and B, etc.

If it is determined in step S146 that the two pieces of the authentication information match each other, then the data storage unit 69 in the electronic data storage function B stores the S-Data in step S147. In step S148, the authentication information storage unit 70 stores the MAC. In step S149, the log generation unit 76 obtains the time from the clock unit 77. In step S150, a log is generated from the time, the electronic data identification information Data-ID, and an event (data input). In step S151, the log is stored in the log storage unit 71, thereby terminating the process.

Figure 32:
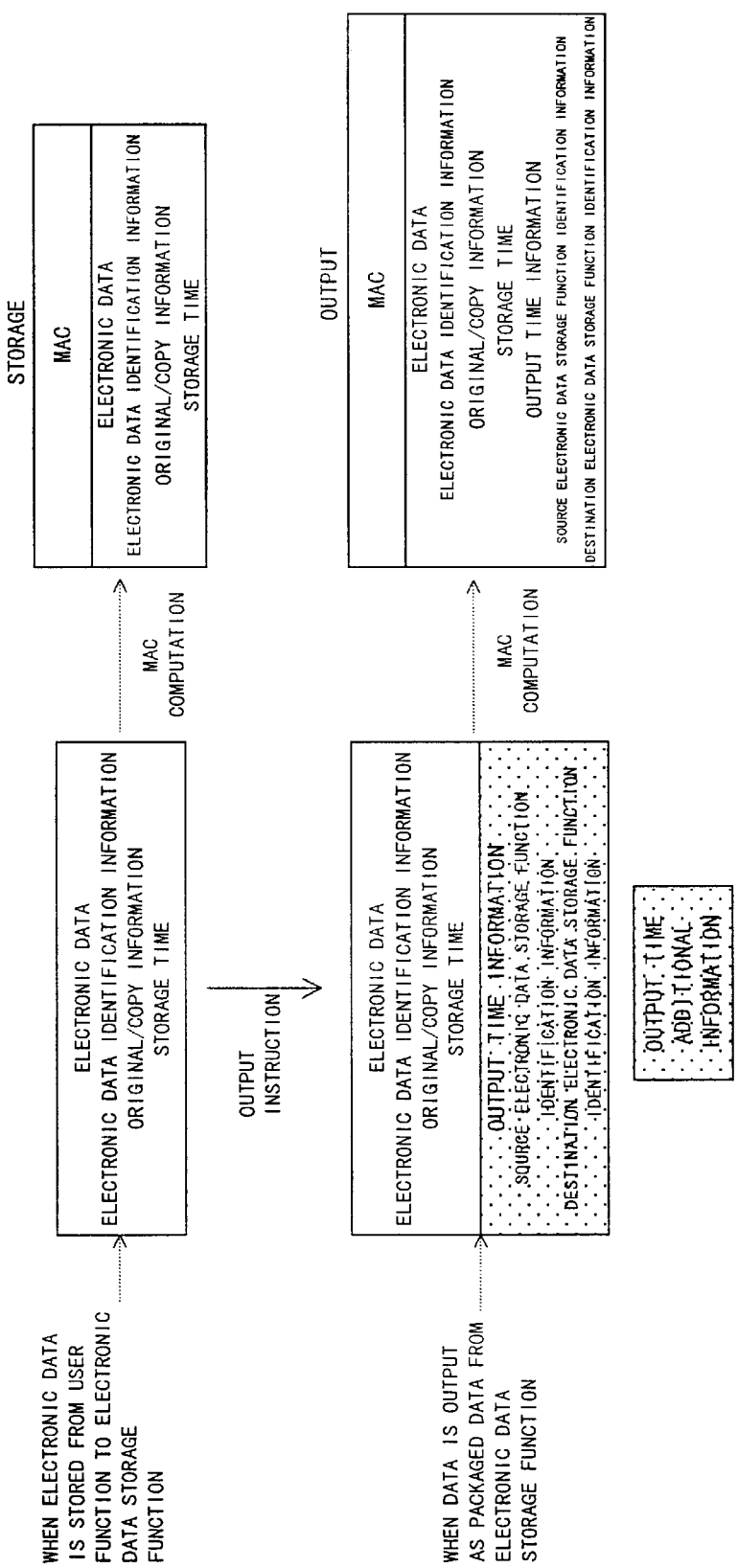
FIG. 32 shows the flow of data from the user function to the electronic data storage function, and the data output from the electronic data storage function.

FIG. 32 shows the flow of the electronic data by referring to the flowcharts. In FIG. 32, when the data is transferred from the user function to the electronic data storage function for storage, the authentication information MAC is computed from the electronic data, the electronic data identification information, the original/copy information, and the storage time. The electronic data, etc. are stored with the authentication information.

When package data is output by the electronic data storage function, for example, the output time information, the source electronic data storage function identification information, and the destination electronic data storage function identification information are added as information added at an output time, in addition to the electronic data, electronic data identification information, original/copy information, and the storage time, to the original data at an output instruction from the user function. The authentication information MAC is computed from the obtained data, and the data with the MAC is output from the electronic data storage function.

FIG. 33 is a flowchart showing the process of verifying the authentication information by the electronic data storage function. FIG. 33 shows in detail the processes in steps S143 through S146 shown in FIG. 31. When the process is started as shown in FIG. 33, the package data P-Data is input to the electronic data storage function in step S153. In step S154, the authentication information verification unit 81 divides the package data P-Data into the S-Data and the MAC. In step S155, the authentication information MAC' is computed from the S-Data using a master key. In step S156, the computed authentication information MAC' is compared with the authentication information MAC divided in step S154. If the two pieces of information equal each other, the information that the verification result is effective is output in step S157. If the two pieces of information do not equal each other, the information that the verification result is ineffective is output in step S158. Thus, the process terminates.

Figure 34:
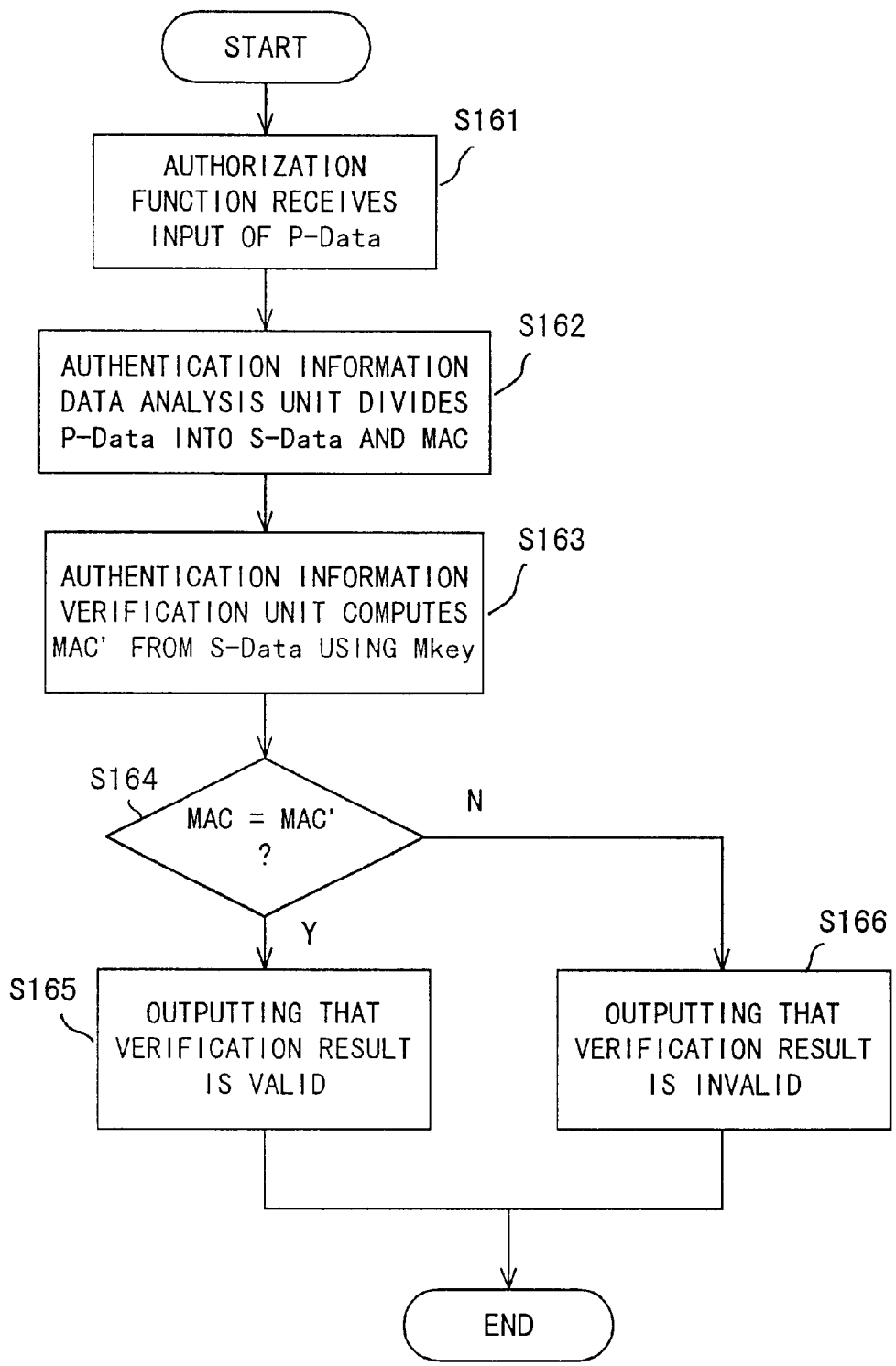
FIG. 34 is a flowchart showing the authentication information verification process by the authorization function.

FIG. 34 is a flowchart showing the process of verifying the authentication information by the authorization function. This process is similar to the process by the electronic data storage function as shown in FIG. 33, but is different in that the P-Data input to the authorization function 51 in step S161 is divided into the S-Data and the MAC by the authentication information data analysis unit 62 in step S162, and that the computation of the authentication information MAC' performed in step S163 is performed by the authentication information verification unit 61 in the authorization function 51.

FIG. 35 is a flowchart showing the process of outputting the location of the authentication information data by the authorization function. In FIG. 35, the authentication information is first verified in the process in steps 161 through 166, which is the same process as shown in FIG. 34. If the information that the verification result of the authentication information is effective is output in step S165, then the authentication information data analysis unit 62 obtains the electronic data storage function identification information at the source of the electronic data from the S-Data in step S167. In step S168, the electronic data storage function is located based on the electronic data storage function identification information database. In step S169, the location of the electronic data storage function containing the authentication information data is output, thereby terminating the process.

Figure 36:
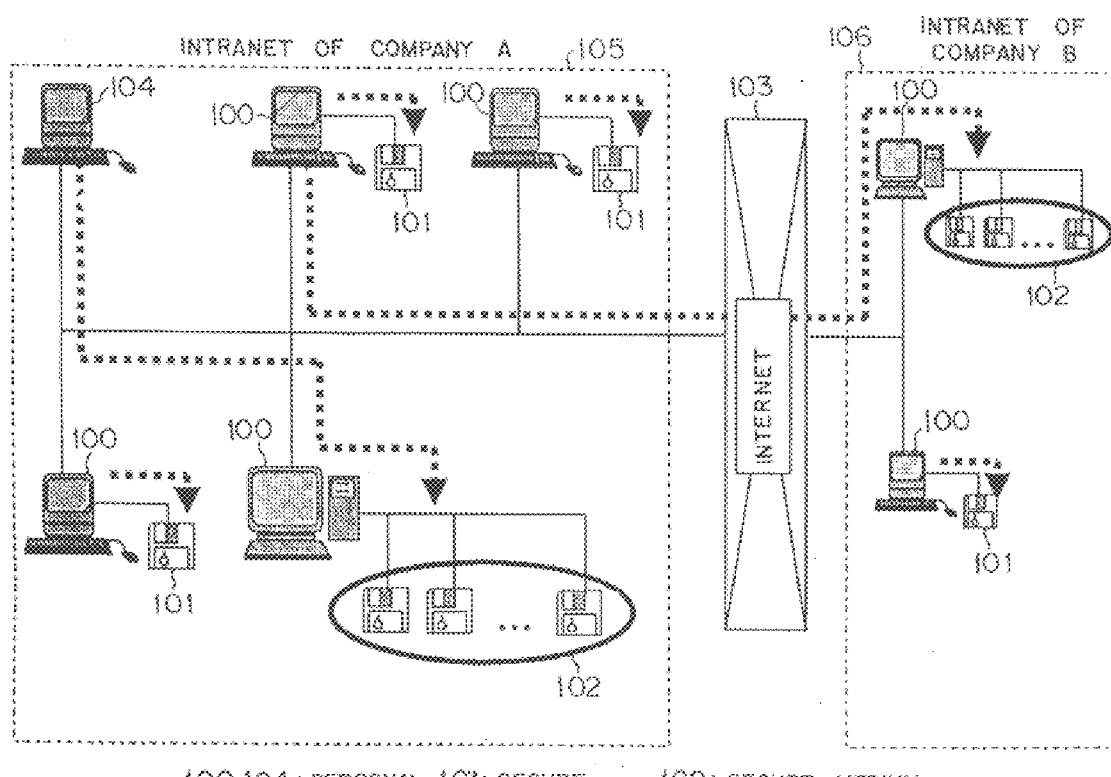
FIG. 36 shows an example of realizing a system according to the second embodiment of the present invention.

FIG. 36 shows an example of an embodiment of the electronic data storage system according to the present invention. In FIG. 36, a secure medium jukebox 102 containing a medium, which stores the electronic data storage function according to the present invention, that is, a secure medium 101 or a plurality of secure media 101, is connected to a personal computer 100. The personal computer 100 in an intranet 105 of company A can access the secure medium 101 in the internal personal computer, or access the secure medium jukebox 102 in an intranet 106 of company B through the Internet 103. A personal computer 104 to which no secure media are connected can access, for example, the secure medium jukebox 102 in the intranet 105 of company A.

Figure 4:
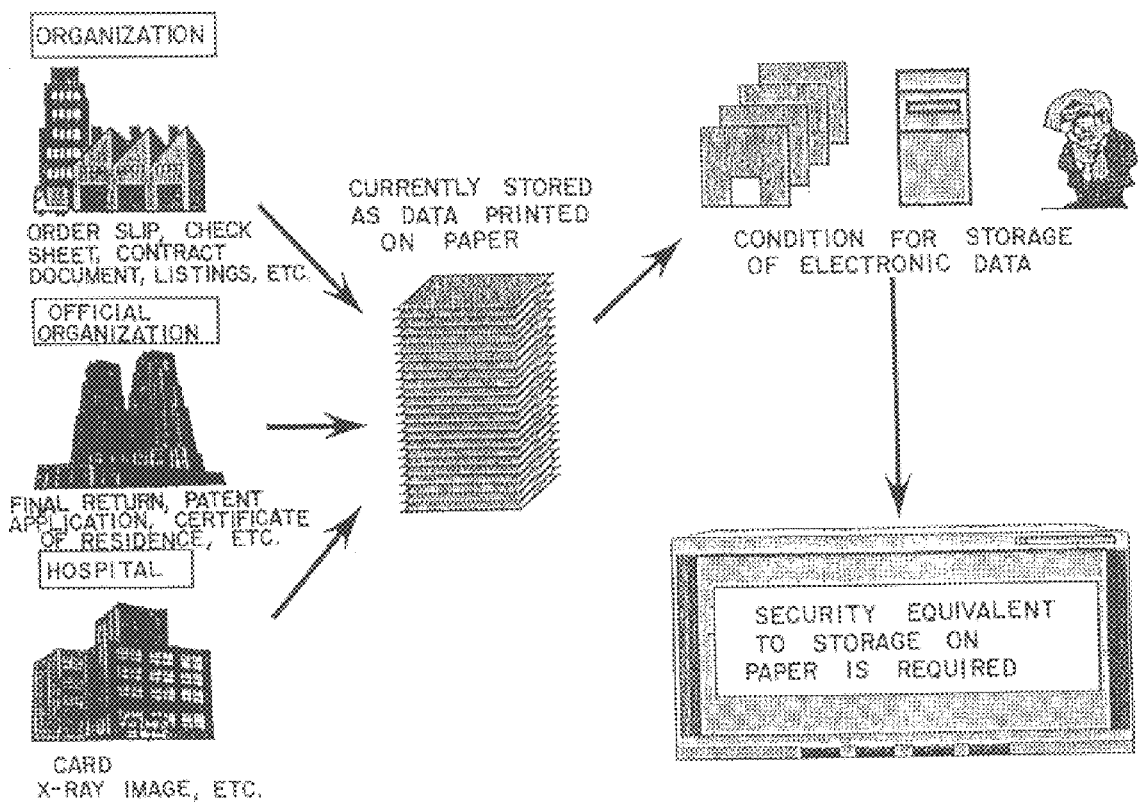
FIG. 4 shows the meanings of the security of electronic data.
Figure 5:
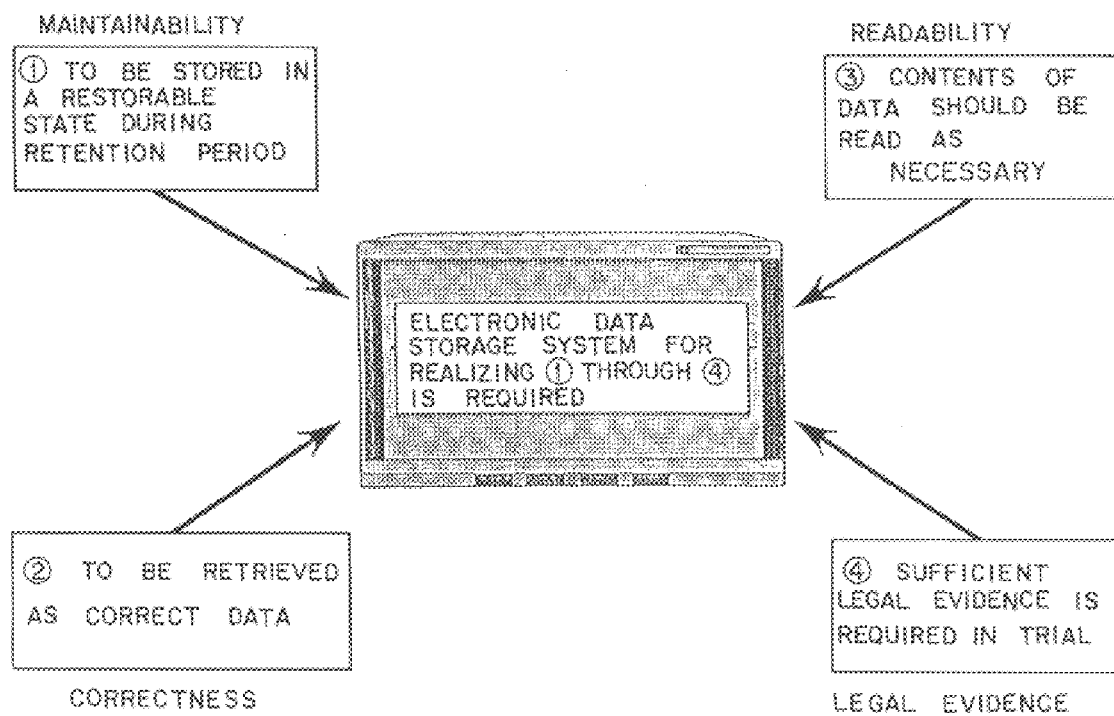
FIG. 5 shows the security of electronic data equivalent to the security obtained by the data written on paper.

FIG. 37 shows obtaining the maintainability of the electronic data in the security as obtained by writing data on paper (described by referring to FIG. 4) according to the present invention. A large volume of data is stored in the electronic data storage apparatus according to the present invention. When the data is stored, for example, portable media as secure media not having the same identifier are used. On condition that stored data must not be deleted or illegally amended, the maintainability of the electronic data can be secured by controlling the access according to the added control information and the retention period information.

Figure 38:
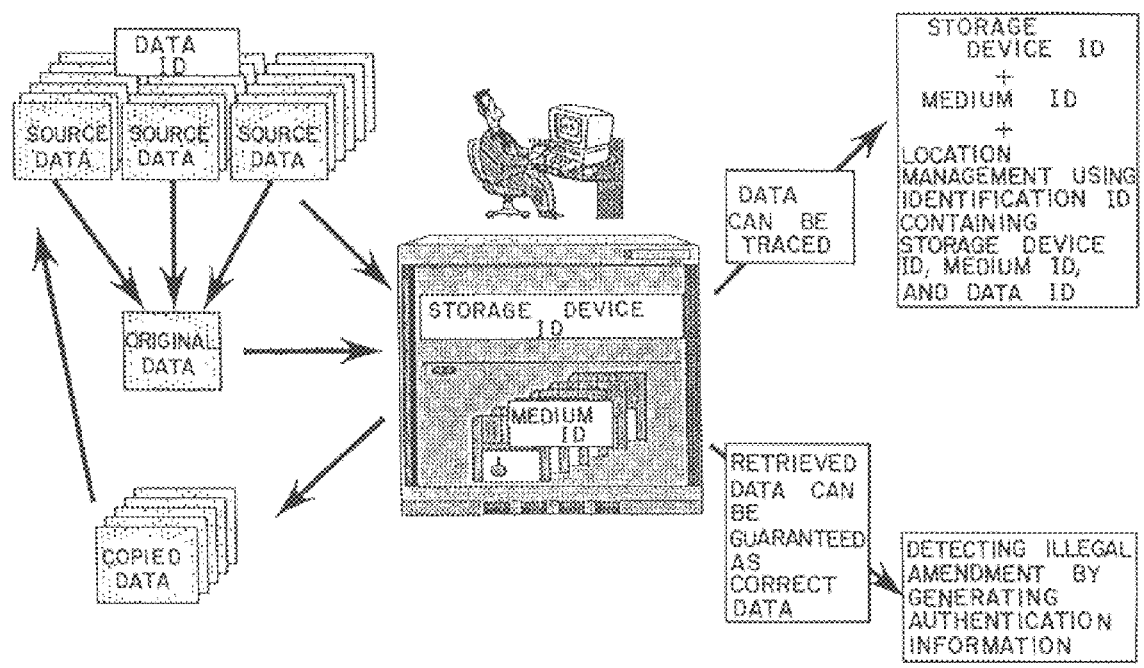
FIG. 38 shows obtaining the correctness of the data according to the present invention.

FIG. 38 shows obtaining the correctness of data according to the present invention. The electronic data storage apparatus generates original data from source data. The original data can be copied as a replica. On condition that the data can be traced, the location management is performed based on an identifier ID containing electronic data storage apparatus identification information, a medium identifier, and electronic data identification information. To indicate that retrieved data is correct, an illegal amendment is searched for by generating authentication information.

Figure 1:
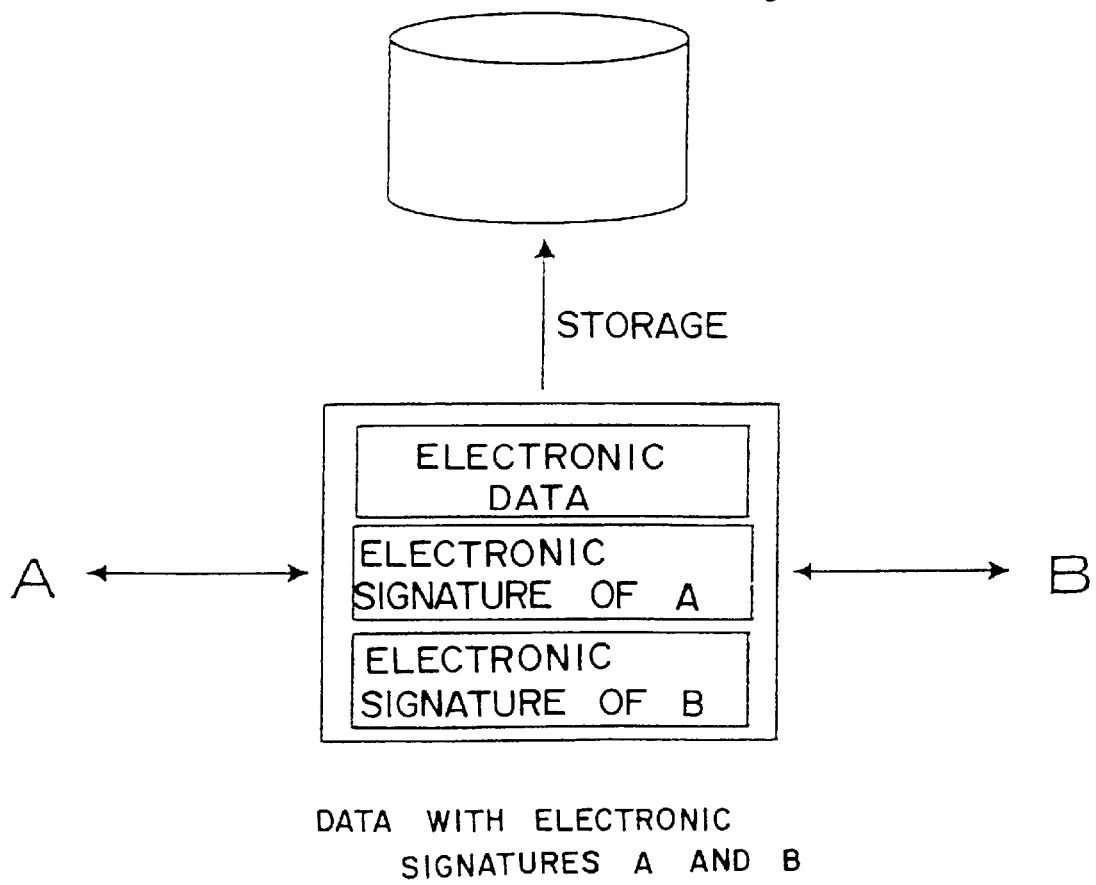
FIG. 1 shows an example of the conventional method for storing electronic data using a TTP.
Figure 2:
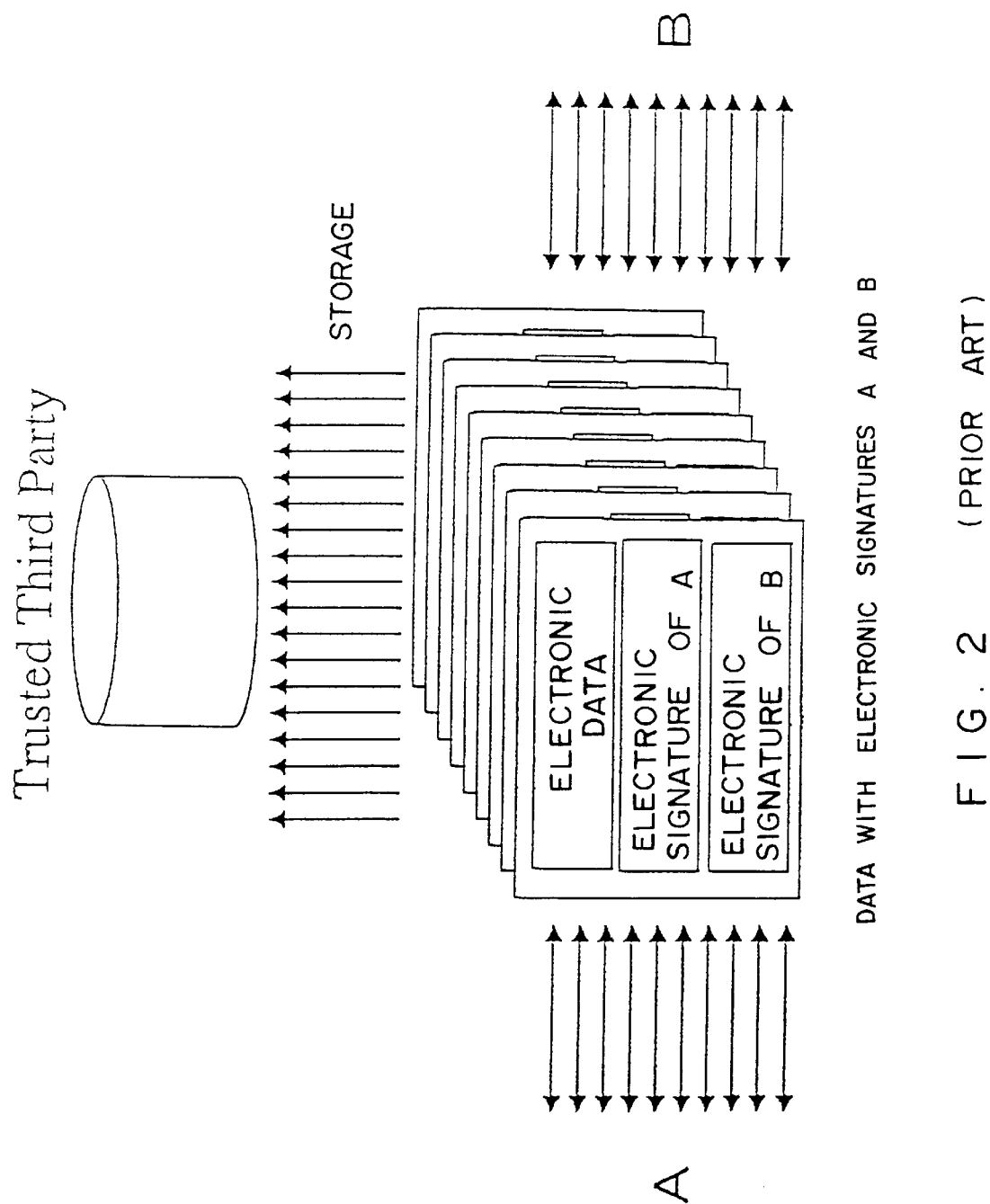
FIG. 2 shows the problem of the conventional method for storing electronic data using a TTP.
Figure 3:
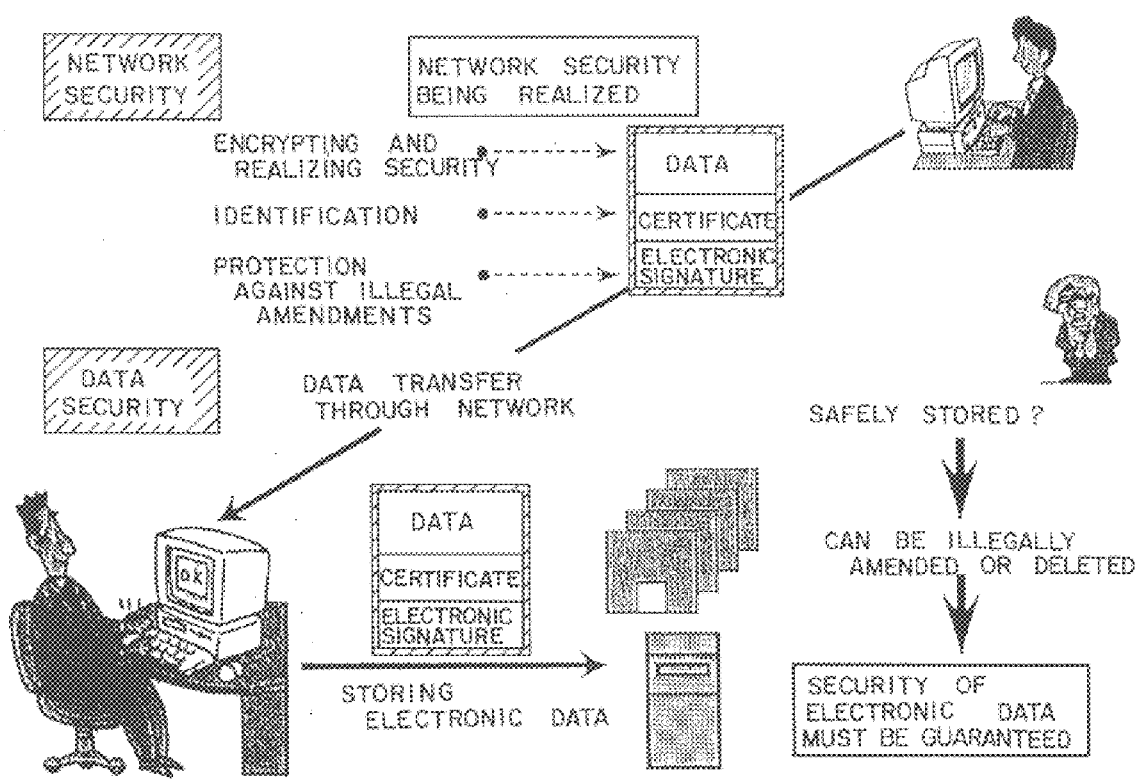
FIG. 3 shows the necessity of the security of electronic data.
Figure 39:
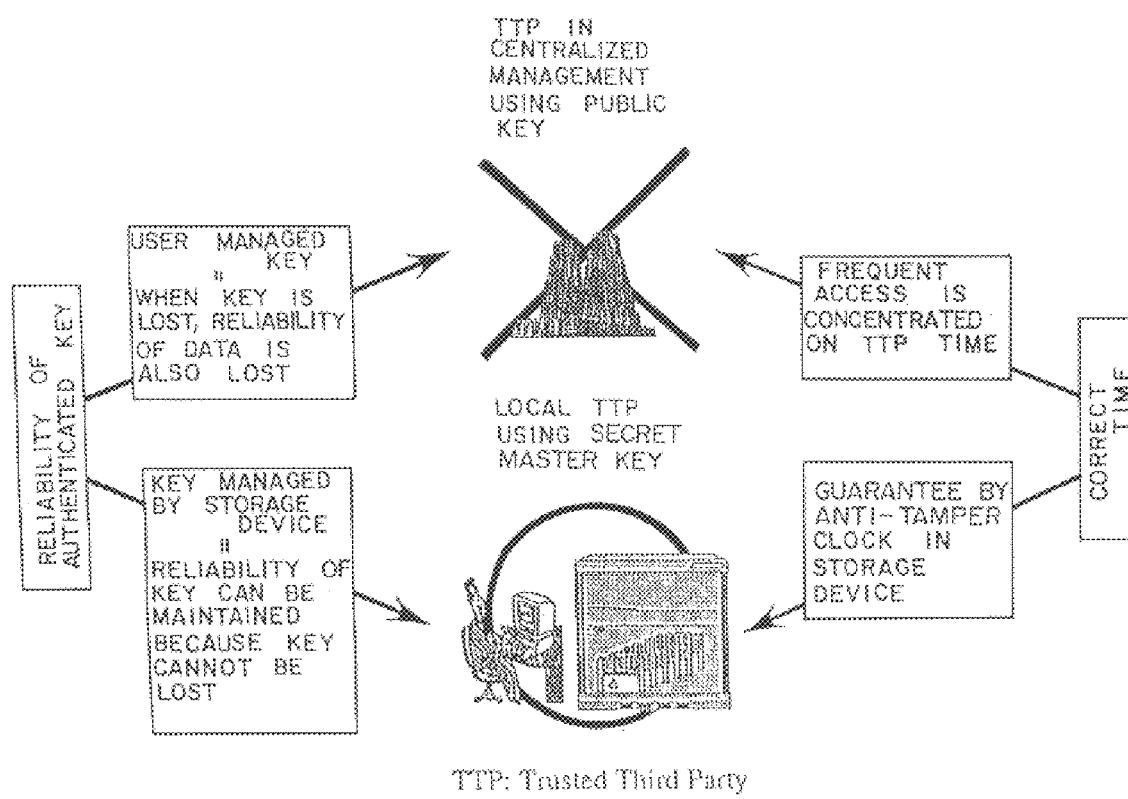
FIG. 39 shows obtaining the legal evidence of the electronic data according to the present invention.

FIG. 39 shows obtaining a sufficient legal evidence for electronic data according to the present invention. With the TTP in the conventional centralized management system as shown in FIG. 1, there are the problems that the user manages a key and therefore reduces the reliability of data if the user has lost the key, and that a large number of accessing operations are concentrated on the clock of the TTP. According to the present invention, the electronic data storage apparatus in the local TTP uses a secret master key and manages keys. Therefore, there is no problem that a key has been lost. As a result, the reliability of data can be maintained. The exact time can be kept by an anti-tamper clock, that is a clock which can not be tampered with, in the electronic data storage apparatus, thereby realizing a local TTP with high reliability.

FIG. 40 shows guaranteeing the reliability of the data using a storage certificate as a legal ground for the security of electronic data according to the present invention. As shown in FIG. 40, when data is transferred, the mutual authentication is performed between the two electronic data storage apparatuses using a master key, and then the encrypted data with a MAC is transmitted. To implement that the electronic data storage apparatus, which has newly stored data after the transfer of the data, cannot deny the fact that it has stored the data, the electronic data storage apparatus which has newly stored the data transmits a storage certificate to a storage device which has output the electronic data. Therefore, the electronic data storage apparatus cannot deny the fact that it has newly stored the data, that is, the electronic data storage apparatus has the capability of protecting against denying new storage of data.

Finally described is the loading of a program onto a computer to realize the electronic data storage apparatus, etc. according to the present invention. FIG. 41 is a block diagram showing the program loading operation onto a computer. In FIG. 41, a computer 95 in a security case comprises a body 96 and a memory 97. A program, etc. can be loaded onto the body 96 from a portable storage medium 99. Otherwise, the program can be loaded from a program provider through a network 98.

The above described program and the program shown in the flowcharts in FIGS. 15 through 19 are stored in, for example, the secure memory 97, and are executed by the body 96. The secure memory 97 can be a hard disk, etc.

For example, a program for use in the mutual authentication between electronic data storage apparatuses can be stored in the secure portable storage medium 99. The mutual authentication can be performed by loading the program onto the computer 96 in the secure case. The secure portable storage medium 99 can be a secure memory card, floppy disk, CD/ROM, optical disk, magneto-optic disk, etc. The mutual authentication can also be realized by transmitting the program, etc. required to perform the mutual authentication process from a program provider to the secure computer 95 through the network 98, and by successfully loading the program.

The embodiments of the present invention have been described above. It is obvious that the present invention is not limited to the above described applications, and can be applied to various embodiments within the scope of what is claimed. For example, according to one of the above described embodiments, random numbers are used in the mutual authentication system between electronic data storage apparatuses. A master key can also be used in the mutual authentication system. A master key can be an encrypted word, or a public key. In the mutual authentication information for use in the above described mutual authentication, for example, a session ID, etc. related to a time, etc. can be included to prevent a replaying attack which is a malicious action performed by, for example, transmitting information again immediately after transmitting the same information. Furthermore, the encryption can be realized by a common method using, for example, a public key to maintain the security of the data through a network and an SCSI cable.

As described above in detail, the conventional problem of a heavy traffic with the TTP can be solved by an electronic data storage apparatus which guarantees the reliability of data stored in the system using a master key according to the present invention. Furthermore, the denial of electronic data storage can be avoided by managing the location of the electronic data using a data transfer request certificate, a storage certificate, and a storage certificate receipt certificate generated through an individual key.

According to the present invention, the electronic data storage function for storing electronic data generates authentication information using a master key assigned by an authorization function. Therefore, it can be confirmed by verifying the authentication information using a master key that the data with the authentication information is the data stored in the electronic data storage function authorized by the authorization function. Since the electronic data identification information is associated with the electronic data storage function identification information assigned by the authorization function when the electronic data identification information is generated, the electronic data can be uniquely identified. Furthermore, since the information indicating that the electronic data to be transferred is the original or a copy, and the identification information of the source and destination electronic data storage function are associated with the authentication information generated using a master key, the location of the electronic data can be managed. As a result, the electronic data can be stored with sufficient legal evidence and contribute to the application fields.

What is claimed is:

1. An electronic data storage apparatus for storing electronic data, comprising:
   a data storage unit storing electronic data;
   an authentication information generation unit generating authentication information used in checking correctness of the electronic data stored in said data storage unit;
   an authentication information data output unit outputting the electronic data stored in said data storage unit after adding to the electronic data the authentication information generated for the electronic data;
   a master key storage unit storing a master key common to a plurality of electronic data storage apparatuses;
   a mutual authentication unit performing mutual authentication between the plurality of electronic data storage apparatuses before the electronic data is transferred between the electronic data storage apparatuses;
   an electronic data storage apparatus identification information storage unit storing electronic data storage apparatus identification information unique to said electronic data storage apparatus, wherein
   said mutual authentication unit generates first mutual authentication information by encrypting the electronic data storage apparatus identification information and random information using the master key, transmits the first mutual authentication information to another electronic data storage apparatus, decrypts the second mutual authentication information using the master key and determines if information included in the decrypted second mutual authentication information matches the random information used to generate the first mutual authentication information.

2. The apparatus according to claim 1, further comprising: a data transfer request unit generating and outputting a data transfer request certificate issued to request another electronic data storage apparatus to transfer data after the mutual authentication performed by said mutual authentication unit when the electronic data is output to the other electronic data storage apparatus.

3. The apparatus according to claim 2, further comprising:
   a certificate storage unit storing a data transfer request certificate when the data transfer request certificate is input and the electronic data corresponding to the certificate is stored in said data storage unit.

4. The apparatus according to claim 3, further comprising:
   a certificate verification unit verifying the data transfer request certificate stored in said certificate storage unit preventing said electronic data storage apparatus from denying the data transfer request issued by said electronic data storage apparatus.

5. The apparatus according to claim 1, further comprising:
   an authentication information verification unit verifying contents of the authentication information using the master key when the electronic data is externally input with the authentication information added to the electronic data.

6. The apparatus according to claim 5, wherein said authentication information verification unit returns a verification result of the authentication information to a source of the electronic data provided with the authentication information.

7. The apparatus according to claim 5, wherein said authentication information verification unit rejects storing externally input electronic data in said data storage unit when said authentication information verification unit detects incorrectness in the electronic data.

8. The apparatus according to claim 5, further comprising:
   a storage certificate issue unit issuing to a requester who requests storage of electronic data a storage certificate which certifies the storage of the electronic data when said authentication information verification unit does not detects incorrectness in the electronic data provided with the authentication information and the input electronic data is stored in said data storage unit.

9. The apparatus according to claim 8, wherein
   said storage certificate issue unit generates the storage certificate in association with electronic data storage apparatus identification information unique to said electronic data storage apparatus.

10. The apparatus according to claim 8, wherein
    said storage certificate issue unit generates the storage certificate by associating the storage certificate with electronic data storage apparatus identification information unique to said electronic data storage apparatus, and by encrypting the storage certificate using an individual key of said electronic data storage apparatus.

11. The apparatus according to claim 10, further comprising:
    a certificate storage unit storing the storage certificate encrypted and issued when the storage certificate is externally input.

12. The apparatus according to claim 11, further comprising:
    a certificate verification unit rejecting storage of a storage certificate in said certificate storage unit when the encrypted storage certificate is externally input, the storage certificate is verified, and incorrectness is detected in contents of the storage certificate.

13. The apparatus according to claim 11, further comprising:
    a certificate verification unit verifying a storage certificate stored in said certificate storage unit using an individual key of the electronic data storage apparatus which issued the storage certificate to suppress rejection of storage of the electronic data when the electronic data storage apparatus which issued the storage certificate denies the storage of the electronic data for the storage certificate.

14. The electronic data storage apparatus according to claim 8, wherein
    said storage certificate issue unit generates an encrypted storage certificate using a master key commonly used among a plurality of electronic data storage apparatuses.

15. The apparatus according to claim 1, wherein
said authentication information generation unit generates the authentication information associated with electronic data storage apparatus identification information unique to said electronic data storage apparatus to manage location of electronic data.

16. The apparatus according to claim 1, wherein
said authentication information data output unit outputs electronic data after adding, to the electronic data, electronic data storage apparatus identification information unique to said electronic data storage apparatus in addition to the authentication information to manage location of the electronic data.

17. An electronic data storage system for storing electronic data, comprising:
an electronic data storage apparatus comprising:
a data storage unit storing electronic data,
an authentication information generation unit generating authentication information used in checking correctness of the electronic data stored in said data storage unit, and
an authentication information data output unit outputting the electronic data stored in said data storage unit after adding to the electronic data the authentication information generated for the electronic data; and
an authorization device comprising:
a specification check unit checking a specification, which comprises a performance quality to store the electronic data, of said electronic data storage apparatus, and authorizing said electronic data storage apparatus when the specification meets predetermined conditions.

18. The system according to claim 17, further comprising:
one or more electronic data storage apparatuses; and
one or more authorization device.

19. The system according to claim 17, wherein said specification check unit checks the specification of the authorized electronic data storage apparatus.

20. The system according to claim 17, wherein said authorization device assigns a master key commonly used among a plurality of authorized electronic data storage apparatuses to each of the electronic data storage apparatuses and wherein each of said electronic data storage apparatuses further comprises a master key storage unit storing the master key.

21. The system according to claim 20, wherein
said authorization device further comprises a master key management unit generating and managing the master key.

22. The system according to claim 21, wherein said master key management unit periodically changing a master key to be assigned to each of said electronic data storage apparatuses.

23. The system according to claim 22, wherein said master key storage unit stores a changed master key when the assigned master key is changed.

24. The system according to claim 21, wherein
said master key management unit assigns a master key to an electronic data storage apparatus in a format of a portable medium which stores the master key and is available when inserted into the electronic data storage apparatus.

25. The system according to claim 17, wherein
said authorization device further comprises:
an electronic data storage apparatus identification information management unit assigning electronic data storage apparatus identification information for uniquely identifying each electronic data storage apparatus to each of a plurality of authorized electronic data storage apparatuses.

26. The system according to claim 25, wherein said electronic data storage apparatus further comprises: an electronic data identification information generation unit generating electronic data identification information associated with the electronic data storage apparatus identification information for electronic data stored in said electronic data storage unit.

27. The system according to claim 26, wherein said authentication information generation unit adds the authentication information associated with the electronic data identification information, and externally outputs resultant information.

28. The system according to claim 27, wherein said authorization device further comprises: an authentication information data analysis unit specifying an electronic data storage apparatus which stores the authentication information electronic data according to electronic data storage apparatus identification information associated with the electronic data identification information.

29. The system according to claim 17, further comprising:
a user device for requesting said electronic data storage apparatus to store electronic data wherein
said authentication information generation unit in said electronic data storage apparatus generates authentication information for detecting correctness or incorrectness of the electronic data when said user device stores the electronic data using a master key commonly provided for a plurality of electronic data storage apparatuses.

30. The system according to claim 29, wherein
said electronic data storage apparatus further comprises an authentication information verification unit verifying contents of the authentication information using a master key.

31. The system according to claim 30, wherein
said authentication information verification unit verifies authentication information and checks whether or not electronic data has been illegally amended when data with authentication information is externally input.

32. The system according to claim 29, wherein
said authentication information generation unit generates authentication information associated with time information about when the authentication information is generated.

33. The system according to claim 29, wherein
said authentication information generation unit generates authentication information associated with electronic data identification information for uniquely identifying electronic data.

34. The system according to claim 29, wherein
said authentication information generation unit generates authentication information associated with original information indicating that electronic data is original data.

35. The system according to claim 34, wherein
said electronic data storage unit stores electronic data identification information for uniquely identifying electronic data, and electronic data storage apparatus identification information for uniquely identifying a destination electronic data storage apparatus to which the electronic data is to be output together with the electronic data when the electronic data is externally output from said electronic data storage apparatus with the electronic data defined as original data.

36. The system according to claim 34, wherein
said authentication information generation unit generates authentication information associated with electronic data identification information for uniquely identifying the electronic data and electronic data storage apparatus identification information for uniquely identifying said electronic data storage apparatus when the electronic data is externally output from said electronic data storage apparatus with the electronic data defined as original data.

37. The system according to lcaim 29, wherein
said authentication information generation unit generates authentication information associated with copy information indicating that electronic data is a copy.

38. The system according to claim 37, wherein
said electronic data storage unit stores, in addition to electronic data, electronic data identification information for uniquely identifying the electronic data and electronic data storage apparatus identification information for uniquely identifying a destination electronic data storage apparatus to which the electronic data is to be output when the electronic data is externally output from said electronic data storage apparatus with the electronic data defined as copied data.

39. The system according to claim 37, wherein
said authentication information generation unit generates authentication information associated with electronic data identification information for uniquely identifying the electronic data and electronic data storage apparatus identification information for uniquely identifying said electronic data storage apparatus when the electronic data is externally output from said electronic data storage apparatus with the elcetronic data defined as copied data.

40. The system according to claim 29, wherein
said authentication information generation unit generates the authentication information associated with the log information when the authentication information is generated.

41. A method for storing electronic data, comprising:
generating first mutual authentication information by encrypting electronic data storage apparatus identification information unique to an electronic data storage apparatus and random information using a master key common to the plurality of electronic data apparatuses;
transmitting the first mutual authentication information to another electronic data storage apparatus:
receiving second mutual authentication information from said other electronic data storage apparatus,
decrypting the second mutual authentication information using the master key;
determining if information included in the decrypted second mutual authentication information matches the random information used to generate the first mutual authentication information;
when the information included in the decrypted second mutual authentication information matches the random information, generating authentication information used in checking correctness of stored electronic data; and
outputting the stored electronic data to said other electronic data storage apparatus after adding to the electronic data the authentication information generated for the electronic data.

42. The method according to claim 41, further comprising:
verifying contents of authentication information when electronic data provided with the authentication information for detecting correctness of the electronic data is input; and
storing the electronic data only when the electronic data has not been illegally amended.

43. A method for storing electronic data, comprising:
instructing an authorization device for authorizing an electronic data storage apparatus which stores an electronic data whether or not a specification of the electronic data storage apparatus, which is a performance quality to store the electronic data satisfies predetermined conditions from the electronic data storage apparatus side, and storing the electronic data in the electronic data storage apparatus if the authorization device determines that the predetermined conditions are satisfied.

44. The method according to claim 43, further comprising:
generating authentication information for checking correctness of the electronic data stored in the electronic data storage apparatus when the electronic data is stored after the determination; and
adding to the electronic data and outputting the authentication information generated for the electronic data when the stored electronic data is output.

45. The method according to claim 44, wherein said authentication information is generated using a master key common to a plurality of electronic data storage apparatuses which distribute and store the electronic data when the authentication information is generated.

46. The method according to claim 44, wherein mutual authentication is performed using a master key common to a plurality of electronic data storage apparatuses which distribute and store the electronic data with a destination electronic data storage apparatus to which the electronic data is to be output before outputting the stored electronic data.

47. The method according to claim 43, wherein contents of authentication information is verified when the electronic data provided with authentication information for checking illegal amendments made to the electronic data is input to the electronic data storage apparatus, and said electronic data is stored only when the authentication information refers to correctness of the data.

48. A computer-readable storage medium controlling a computer and comprising a process of:
generating first mutual authentication information by encrypting electronic data storage apparatus identification information unique to an electronic data storage apparatus and random information using a master key common to the plurality of electronic data storage apparatuses;
transmitting the first mutual authentication information to another electronic data storage apparatus;
receiving second mutual authentication information from said other electronic data storage apparatus;
decrypting the second mutual authentication information using the master key;
determining if information included in the decrypted second mutual authentication matches the random information used to generate the first mutual authentication information;
when the information included in the decrypted second mutual authentication information matches the random information, generating authentication information used in checking, correctness of stored electronic data; and outputting the stored electronic data to said other electronic data storage apparatus after adding to the electronic data the authentication information generated for the electronic data.

49. The computer-readable storage medium according to claim 48, further comprising:

verifying contents of authentication information when electronic data provided with the authentication information for detecting an illegal amendment made to the electronic data is input; and storing the electronic data only when the electronic data has not been illegally amended.

50. An electronic data storage apparatus for storing electronic data, comprising:

data storage means for storing electronic data;

authentication information generation means for generating authentication information used in checking correctness of the electronic data stored in said data storage means;

authentication information data output means for outputting the electronic data stored in said data storage means after adding to the electronic data the authentication information generated for the electronic data;

master key storage means for storing a master key common to a plurality of electronic data storage apparatuses;

mutual authentication means for performing mutual authentication between the electronic data storage apparatuses before the electronic data is transferred between the electronic data storage apparatuses; and electronic data storage apparatus identification information storage means for storing electronic data storage apparatus identification information unique to said electronic data storage apparatus, wherein said mutual authentication means generates first mutual authentication information by encrypting the electronic data storage apparatus identification information and random information using the master key, transmits the first mutual authentication information to another electronic data storage apparatus, receives second mutual authentication information from said other electronic data storage apparatus, decrypts the second mutual authentication information using the master key and determines if information included in the decrypted second mutual authentication information matches the random information used to generate the first mutual authentication information.

51. An electronic data storage system for storing electronic data, comprising:

an electronic data storage apparatus, comprising:
 data storage means for storing electronic data,
 authentication information generation means for generating authentication information used in checking correctness of the electronic data stored in said data storage means,
 authentication information data output means for outputting the electronic data stored in said data storage means after adding to the electronic data the authentication information generated for the electronic data; and an authorization device comprising:
 specification check means for checking a specification of said electronic data storage apparatus, which is a performance quality to store the electronic data, and authorizing said electronic data storage apparatus when the specification meats predetermined conditions.

52. A computer data signal embodied in a carrier wave and representing a program that makes the computer perform a process for storing an electronic data, and the process, comprising:

generating first mutual authentication information by encrypting the electronic data storage apparatus;

identification information unique to an electronic data storage apparatus and random information using a master key common to the plurality of electronic data storage apparatuses;

transmitting the first mutual authentication information to another electronic data storage apparatus;

receiving second mutual authentication information from said another electronic data storage apparatus;

decrypting the second mutual authentication information using the master key;

determining if information included in the decrypted second mutual authentication information matches the random information used to generate the first mutual authentication information;

when the information included in the decrypted second mutual authentication information matches the random information, generating authentication information used in checking correctness of stored electronic data; and outputting the stored electronic data to said another electronic data storage apparatus after adding to the electronic data the authentication information generated for the electronic data.

53. A computer data signal embodied in a carrier wave and representing a program that makes the computer perform a process for storing an electronic data, and the process, comprising:

instructing an authorization device for authorizing an electronic data storage apparatus which stores the electronic data whether or not a specification of the electronic data storage apparatus, which is a performance quality to store the electronic data satisfies predetermined conditions; and storing the electronic data in the electronic data storage apparatus if the authorization device determines that the predetermined conditions are satisfied.

54. The system according to claim 25, wherein said electronic data storage apparatus identification information management unit assigns the electronic data storage apparatus identification information in a format to a portable medium which stores the elctronic data storage apparatus identification information and is available when inserted into the electronic data storage apparatus.

* * * * *

UNITED STATES PATENT AND TRADEMARK OFFICE
CERTIFICATE OF CORRECTION

PATENT NO. : 6,421,779 B1
DATED : July 16, 2002
INVENTOR(S) : Yasutsuga Kuroda et al.

It is certified that error appears in the above-identified patent and that said Letters Patent is hereby corrected as shown below:

<u>Title page,</u>
Item [56], FOREIGN PATENT DOCUMENTS, insert -- EP 0 718 999 A2 6/1996 --.

<u>Column 30,</u>
Line 6, delete "meats", insert -- meets --.

Signed and Sealed this

Fourth Day of February, 2003

JAMES E. ROGAN
*Director of the United States Patent and Trademark Office*